(12) United States Patent
Baijal et al.

(10) Patent No.: US 11,514,107 B2
(45) Date of Patent: Nov. 29, 2022

(54) IMAGE DISPLAY APPARATUS AND OPERATION METHOD OF THE SAME

(71) Applicant: SAMSUNG ELECTRONICS CO., LTD., Suwon-si (KR)

(72) Inventors: Anant Baijal, Suwon-si (KR); Daeeun Hyun, Suwon-si (KR); Mijeong Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 612 days.

(21) Appl. No.: 16/560,498

(22) Filed: Sep. 4, 2019

(65) Prior Publication Data

US 2020/0073885 A1 Mar. 5, 2020

(30) Foreign Application Priority Data

Sep. 5, 2018 (KR) .......................... 10-2018-0106046

(51) Int. Cl.
| | | |
|---|---|---|
| *G06F 16/30* | (2019.01) | |
| *G06F 16/65* | (2019.01) | |
| *G06F 16/41* | (2019.01) | |
| *G06F 16/438* | (2019.01) | |
| *G06F 16/783* | (2019.01) | |
| *G06F 16/23* | (2019.01) | |
| *G06F 16/738* | (2019.01) | |
| *G06F 16/63* | (2019.01) | |

(52) U.S. Cl.
CPC .............. *G06F 16/65* (2019.01); *G06F 16/23* (2019.01); *G06F 16/41* (2019.01); *G06F 16/438* (2019.01); *G06F 16/63* (2019.01); *G06F 16/738* (2019.01); *G06F 16/7844* (2019.01)

(58) Field of Classification Search
CPC ........ G06F 16/23; G06F 16/41; G06F 16/438; G06F 16/63; G06F 16/65; G06F 16/68; G06F 16/738; G06F 16/7844
See application file for complete search history.

(56) References Cited

U.S. PATENT DOCUMENTS

| | | | |
|---|---|---|---|
| 7,991,715 | B2 | 8/2011 | Schiff et al. |
| 8,259,192 | B2 | 9/2012 | Nair |
| 8,504,422 | B2 | 8/2013 | Mei et al. |
| 8,704,760 | B2 | 4/2014 | Kang et al. |
| 9,213,747 | B2 | 12/2015 | Cremer et al. |
| 9,283,484 | B1 | 3/2016 | McCarthy |
| 9,495,608 | B2 | 11/2016 | Wang |
| 11,120,290 | B2 | 9/2021 | Baijal et al. |

(Continued)

FOREIGN PATENT DOCUMENTS

| | | |
|---|---|---|
| AU | 2012315625 A1 | 4/2013 |
| JP | 4160305 B2 | 10/2008 |

(Continued)

OTHER PUBLICATIONS

Article entitled "System for Matching Paintings with Music Based on Emotions", by Lee et al., dated 2016 (Year: 2016).*

(Continued)

*Primary Examiner* — Mahesh H Dwivedi
(74) *Attorney, Agent, or Firm* — Sughrue Mion, PLLC

(57) ABSTRACT

Method and apparatus for obtaining audio corresponding to a plurality of images, based on semantic information and the emotion information of the plurality of images.

18 Claims, 17 Drawing Sheets

(56) References Cited

U.S. PATENT DOCUMENTS

| | | | |
|---|---|---|---|
| 2008/0256100 A1* | 10/2008 | van de Sluis | G06F 16/639 |
| | | | 707/E17.103 |
| 2010/0091138 A1 | 4/2010 | Nair | |
| 2011/0288929 A1* | 11/2011 | Mei | G06F 16/4393 |
| | | | 707/E17.084 |
| 2012/0076427 A1* | 3/2012 | Hibino | G06F 16/54 |
| | | | 382/218 |
| 2016/0035330 A1* | 2/2016 | Singh | G10H 1/38 |
| | | | 84/609 |
| 2016/0125259 A1 | 5/2016 | Wang | |
| 2017/0092247 A1 | 3/2017 | Silverstein | |
| 2017/0098122 A1 | 4/2017 | el Kaliouby et al. | |
| 2017/0294210 A1 | 10/2017 | Abramson et al. | |
| 2018/0226063 A1* | 8/2018 | Wood | G10H 1/368 |
| 2019/0174242 A1 | 6/2019 | Jin et al. | |
| 2020/0135158 A1* | 4/2020 | Yao | G06F 16/635 |
| 2020/0329211 A1* | 10/2020 | Jeong | G06V 40/172 |

FOREIGN PATENT DOCUMENTS

| | | |
|---|---|---|
| KR | 10-2009-0080330 A | 7/2009 |
| KR | 10-2013-0110965 A | 10/2013 |
| KR | 10-2014-0037439 A | 3/2014 |
| KR | 10-1657975 B1 | 9/2016 |
| KR | 10-1708682 B1 | 2/2017 |
| KR | 10-2017-0041447 A | 4/2017 |
| KR | 10-2017-0110473 A | 10/2017 |
| KR | 10-2018-0081856 A | 7/2018 |

OTHER PUBLICATIONS

Article entitled "Emotion-based Impressionism Slideshow with Automatic Music Accompaniment", by Li et al., dated Sep. 28, 2007 (Year: 2007).*

Article entitled "Photosense: Make Sense of Your Photos with Enriched Harmonic Music via Emotion Association", by Su et al., dated 2011 (Year: 2011).*

Article entitled "Suggesting Songs for Media Creations using Semantics", by Joshi et al., dated 2010 (Year: 2010).*

Article entitled "Tiling Slideshow", by Chen et al., dated Oct. 27, 2006 (Year: 2006).*

Article entitled "Semantic High-Level Features for Automated Cross-Modal Slideshow Generation", by Dunker et al., dated 2009 (Year: 2009).*

Article entitled "Content-Aware Auto-Soundtracks for Personal Photo Music Slideshows", by Dunker et al., dated 2011. (Year: 2011).*

International Search Report (PCT/ISA/210) and Written Opinion (PCT/ISA/237) dated Nov. 26, 2019 issued by the International Searching Authority in International Application PCT/KR2019/010039.

Office Action dated Feb. 17, 2021, issued by the United States Patent and Trademark Office in U.S. Appl. No. 16/545,170.

International Search Report (PCT/ISA/210) and Written Opinion (PCT/ISA/237) dated Dec. 13, 2019, issued by the International Searching Authority in International Application PCT/KR2019/011254.

Ningning Liu et al., "Visual affective classification by combining visual and text features", PLOS One, vol. 12, No. 8, XP055649400, Aug. 29, 2017, pp. 1-21.

Florin Cutzu et al., "Estimating the photorealism of images: Distinguishing paintings from photographs", 2003 IEEE Computer Society Conference on Computer Vision and Pattern Recognition (CVPR'03), vol. 2, IEEE, Los Alamos, CA, XP010644687, Jun. 18, 2003, 8 pages.

Babak Saleh et al., "Large-scale Classification of Fine-Art Paintings: Learning The Right Metric on The Right Feature", XP055649385, May 5, 2015, 22 pages, Retrieved from URL <https://www.researchgate.net/profile/Babak_Saleh/publication/275974573_Large-scale_Classification_of_Fine-Art_Paintings_Learning_The_Right_Metric_on_The_Right_Feature/links/5556123308aeaaff3bf5eca9/Lar ge-scale-Classification-of-Fine-Art-Paintings-Learning-The-Right-Metric-on-The-Right-Feature.pdf>.

Communication dated Dec. 17, 2019 issued by the European Patent Office in counterpart European Application No. 19192057.8.

Anonymous, "Recommending music for affective artworks and photographs", Jun. 2019, ACM ICMR' 19, 9 pages total.

Baumgartner et a;. "The emotional power of music: How music enhances the feeling of affective pictures," Brain Research, vol. 1075, pp. 151-164, 2006.

Jeong, et al., "Congruence of happy and sad emotion in music and faces modifies cortical audiovisual activation," NeuroImage, vol. 54, No. 4, pp. 2973-2982, doi: 10.1016/j.neuroimage.2010.11.017., 2011 (Abstract, total 2 pages).

Hanser et al. "Music Influences Ratings of the Affect of Visual Stimuli," Psychological Topics, vol. 22, No. 2, pp. 305-324, 2013, Total 21 pages.

Schindler et al., "Measuring aesthetic emotions: A review of the literature and a new assessment tool," PLOS One, Vo. 12, No. 6, pp. 1-45, e0178899, 2017.

Campos-Bueno et al. "Emotional Dimensions of Music and Painting and their Interaction," Spanish Journal of Psychology, vol. 18, No. e54, pp. 1-12, 2015.

Sasaki et al. "Affective Music Recommendation System using Input Images," In ACM SIGGRAPH Posters (SIGGRAPH '13), ACM, New York, NY, USA, Article 90, 2013, Total 1 page.

Wu et al. "Bridging Music and Image via Cross-Modal Ranking Analysis," IEEE Transactions on Multimedia, vol. 18, No. 7, pp. 1305-1318, 2016.

Zhao et al., "Emotion Based Image Musicalization," IEEE Intl. Conf. Multimedia and Expo Workshops (IEEE ICME Workshops), 2014, Total 6 pages.

Verma et al., "Learning Affective Correspondence Between Music and Image," IEEE ICASSP, pp. 3975-3979, 2019.

Duthie et al., "Do Music and Art Influence One Another? Measuring Cross-modal Similarities in Music and Art," Graduate Theses and Dissertations, 13163 Iowa State University, 2013, Total 23 pages.

Russell, "A Circumplex Model of Affect," Journal of Personality and Social Psychology, vol. 39, No. 6, pp. 1161-1178, 1980, Total 19 pages.

Kim et al. "Building Emotional Machines: Recognizing Image Emotions through Deep Neural Networks," IEEE Transactions on Multimedia, vol. 20, No. 11, pp. 2980-2992, 2018, DOI 10.1109/TMM.2018.2827782.

Chen et al., "Learning Deep Features for Image Emotion Classification," IEEE ICIP, pp. 4491-4495, 2015.

Joshi et al., "Aesthetics and Emotions in Images," IEEE Signal Processing Magazine, vol. 28, No. 5, pp. 94-115, 2011.

Panda et al., "Contemplating Visual Emotions: Understanding and Overcoming Dataset Bias," ECCV, pp. 594-612, 2018, Total17 pages.

Saleh et al., "Large-scale Classification of Fine-Art Paintings: Learning The Right Metric on The Right Feature," arXiv:1505.00855v1, Int'l Conf. Data Mining Workshops, 2015, Total 21 pages.

Karayev et al., "Recognizing Image Style," Proc. British Machine Vision Conference (BMVC), 2014, Total 11 pages.

Spotify, https://www.spotify.com/us/ (Last accessed Apr. 2020).

WikiArt. https://www.wikiart.org/ (Last accessed Apr. 2020).

Palmer et al., "Music-color associations are mediated by emotion," PNAS, vol. 110, No. 22, pp. 8836-8841, 2013.

You et al., "Building a Large Scale Dataset for Image Emotion Recognition: The Fine Print and The Benchmark," 30th AAAI Conference on Artificial Intelligence (AAAI), pp. 308-314, 2016.

Cowen et al., "Self-report captures 27 distinct categories of emotion bridged by continuous gradients," Proc. National Academy of Sciences (PNAS) Early Edition, pp. E7900-E7909, 2017.

Mohammad et al., "WikiArt Emotions: An Annotated Dataset of Emotions Evoked by Art," In Proc. of the 11th Edition of the Language Resources and Evaluation Conference (LREC), 2018, Total 14 pages.

He et al., "Deep Residual Learning for Image Recognition," arXiv:1512.03385, pp. 1-12, 2015.

(56) References Cited

OTHER PUBLICATIONS

Kingma et al., "ADAM: A Method for Stochastic Optimization," arXiv:1412.6980v9, Proc. 3rd Int'l. Conf. Learning Representations (ICLR), 2015, Total 15 pages.
Smith, "Cyclical Learning Rates for Training Neural Networks," arXiv:1506.01186v6, 2016, Total 10 pages.
Loshchilov et al. "SGDR: Stochastic Gradient Descent with Warm Restarts," Proc. Int'l. Conf. Learning Representations (ICLR), 2017, Total 16 pages.
Valdez et al., "Effects of Color on Emotions," Journal of Experimental Psychology, General, vol. 123, No. 4, pp. 394-409, 1994, Total 17 pages.
Solli et al., "Color Emotions for Multi-Colored Images," Color Research & Application, vol. 36, No. 3, pp. 210-221, 2011, Total 13 pages.
Machajdik et al., "Affective Image Classification using Features Inspired by Psychology and Art Theory," In Proceedings of the 18th ACM International Conference on Multimedia (ACM MM '10), pp. 83-92, 2010.
Tan et al., "Ceci n'est pas une pipe: A Deep Convolutional Network for Fine-art Paintings Classification," Proc. IEEE Int'l Conf. Image Proc. (IEEE ICIP), pp. 3703-3707, 2016.

* cited by examiner

| SEMANTIC INFORMATION | GENRE | ERA | ARTIST |
|---|---|---|---|
| Artwork : Abstract | GENRE 1 | 1600-1700 | ARTIST 1 |
| Artwork : Classical | GENRE 2 | 1600-1700 | ARTIST 2 |
| Artwork : Folk | GENRE 3 | 1800-1900 | ARTIST 3 |
| ⋮ | ⋮ | ⋮ | ⋮ |
| Photograph : Landscape | GENRE n | 2000 | ARTIST n |

IMAGE DISPLAY APPARATUS AND OPERATION METHOD OF THE SAME

CROSS-REFERENCE TO RELATED APPLICATION(S)

This application is based on and claims priority under 35 U.S.C. § 119 to Korean Patent Application No. 10-2018-0106046, filed on Sep. 5, 2018, in the Korean Intellectual Property Office, the disclosure of which is incorporated by reference herein in its entirety.

BACKGROUND

1. Field

The disclosure relates to image display apparatuses and operation methods thereof, and more particularly, to an image display apparatus capable of outputting at least one piece of audio corresponding to an image that is displayed on the image display apparatus, and a method of operating the image display apparatus.

2. Description of the Related Art

Artificial intelligence (AI) systems are computer systems configured to realize human-level intelligence and train themselves and make determinations spontaneously to become smarter, in contrast to existing rule-based smart systems. Because recognition rates of AI systems improve and the AI systems more accurately understand a user's preferences the more they are used, existing rule-based smart systems are being gradually replaced by deep-learning AI systems.

AI technology includes machine learning (deep learning) and element technologies employing the machine learning. Machine learning is an algorithm technology that self-classifies/learns the characteristics of input data, and uses a machine learning algorithm, such as deep learning, and includes technical fields, such as linguistic understanding, visual understanding, deduction/prediction, knowledge representation, and operation control.

Various fields to which AI technology is applied are as follows. Linguistic understanding is a technique of recognizing a language/character of a human and applying/processing the language/character of a human, and includes natural language processing, machine translation, a conversation system, questions and answers, voice recognition/synthesis, and the like. Visual understanding is a technique of recognizing and processing an object like in human vision, and includes object recognition, object tracking, image search, human recognition, scene understanding, space understanding, image improvement, and the like. Deduction/prediction is a technology of logically performing deduction and prediction by determining information, and includes knowledge/probability-based deduction, optimization prediction, a preference-based plan, recommendation, and the like. Knowledge representation is a technique of automatically processing human experience information as knowledge data, and includes knowledge establishment (data generation/classification), knowledge management (data utilization), and the like. Operation control is a technique of controlling autonomous driving of a vehicle and motions of a robot, and includes motion control (navigation, collision avoidance, and driving), manipulation control (behavior control), and the like.

SUMMARY

Provided are image display apparatuses capable of determining and outputting at least one piece of audio corresponding to a plurality of images, and a method of operating the image display apparatus.

Additional aspects will be set forth in part in the description which follows and, in part, will be apparent from the description, or may be learned by practice of the presented embodiments of the disclosure.

According to an embodiment of the disclosure, an image display apparatus includes a display configured to display a plurality of images; a memory storing one or more instructions; and a processor configured to execute the one or more instructions stored in the memory to obtain semantic information comprising first semantic information corresponding to the first image and second semantic information corresponding to the second image by using a first neural network, obtain emotion information comprising first emotion information corresponding to the first image and second emotion information corresponding to the second image by using a second neural network, determine at least one piece of audio corresponding to the first image and the second image, based on the first semantic information, the second semantic information, the first emotion information, and the second emotion information, and output the at least one piece of audio.

The processor may be further configured to determine the at least one piece of audio corresponding to the first semantic information, the second semantic information, the first emotion information, and the second emotion information by using a third neural network.

The processor may be further configured to obtain audio information corresponding to the first image and the second image, based on the first semantic information and the second semantic information, and determine the at least one piece of audio, based on the audio information.

The processor may be further configured to determine first audio, based on the first semantic information and the first emotion information, and generate a first playlist including the first audio, and determine second audio, based on the second semantic information and the second emotion information, and generate a second playlist including the second audio.

The processor may be further configured to select a playlist from among at least one of the first playlist and the second playlist, based on a user input, and output audio included in the playlist.

The processor may be further configured to determine a first weight corresponding to the first image, based on the first emotion information, a second weight corresponding to the second image, based on the second emotion information, and determine the at least one piece of audio by applying the first weight and the second weight to at least one of the semantic information or the emotion information.

The processor may be further configured to determine first audio, based on the first weight, the first semantic information, and the first emotion information, determine second audio, based on the second weight, the second semantic information, and the second emotion information, and generate a playlist including the first audio and the second audio, wherein a number of pieces of the first audio and a number of pieces of the second audio are determined based on the first weight and the second weight.

The processor may be further configured to change sizes of the first image and the second image, respectively based on the first weight and the second weight, and display the first image and the second image having changed sizes.

The processor may be further configured to obtain representative emotion information that is representative of the first image and the second image, based on the first emotion information, the second emotion information, the first weight, and the second weight, and determine the at least one piece of audio, based on the representative emotion information.

The processor may be further configured to generate a representative image by synthesizing the first image and the second image, based on at least one of the first weight and the second weight or the representative emotion information, and display the representative image.

The processor may be further configured to obtain the representative emotion information, based on a background image that is displayed on the display.

According to an embodiment of the disclosure, an operation method of an image display apparatus includes displaying a first image among a plurality of images and a second image among the plurality of images; obtaining semantic information comprising first semantic information corresponding to the first image and second semantic information corresponding to the second image by using a first neural network; obtaining emotion information comprising first emotion information corresponding to the first image and second emotion information corresponding to the second image by using a second neural network; determining at least one piece of audio corresponding to the first image and the second image, based on the first semantic information, the second semantic information, the first emotion information, and the second emotion information; and outputting the at least one piece of audio.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
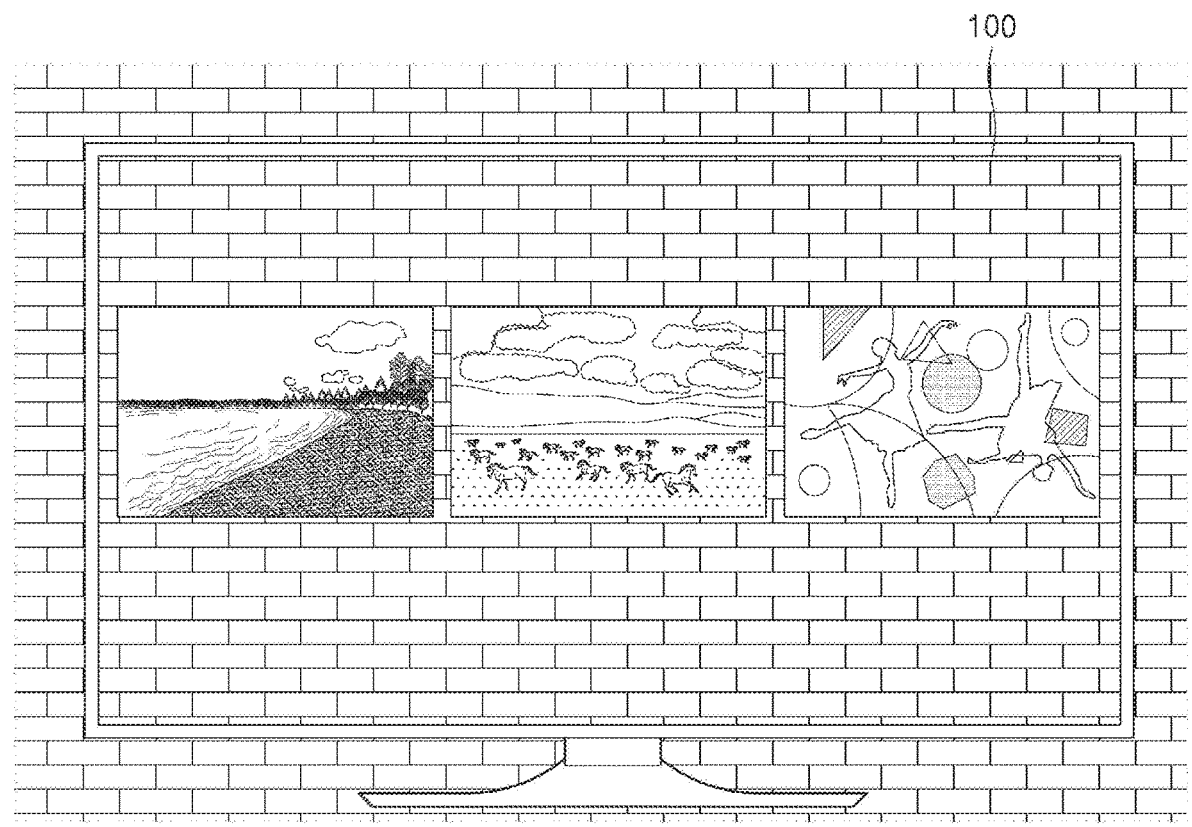
FIG. 1 illustrates an image display apparatus according to an embodiment of the disclosure.

Throughout the disclosure, the expression "at least one of a, b or c" indicates only a, only b, only c, both a and b, both a and c, both b and c, all of a, b, and c, or variations thereof.

Hereinafter, the terms used in the specification will be briefly described, and then the disclosure will be described in detail.

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms "unit," "-er (-or)," and "module" when used in this specification refers to a unit in which at least one function or operation is performed, and may be implemented as hardware, software, or a combination of hardware and software.

Embodiments of the disclosure are described in detail herein with reference to the accompanying drawings so that this disclosure may be easily understood by one of ordinary skill in the art to which the disclosure pertains. The embodiments may, however, be embodied in many different forms and should not be construed as being limited to the examples set forth herein. In the drawings, parts irrelevant to the description are omitted for simplicity of explanation, and like numbers refer to like elements throughout.

The term "user" used herein denotes a person or operator who controls a system, a function, or an operation. Examples of the user may include an inventor, a manager, or an installation engineer.

FIG. 1 illustrates an image display apparatus 100 according to an embodiment of the disclosure.

The image display apparatus 100 according to an embodiment of the disclosure may be a TV, but this is merely an embodiment of the disclosure. The image display apparatus 100 may be implemented as various types of devices including a display. For example, the image display apparatus 100 may be any type of electronic device, such as a mobile phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, an MP3 player, or a wearable device. In particular, embodiments of the disclosure may be easily implemented in an image display apparatus having a large display, such as a TV. However, embodiments of the disclosure are not limited thereto. The image display apparatus 100 may be fixed or movable, or a digital broadcast receiver.

The image display apparatus 100 may be implemented as a flat display apparatus, a curved display apparatus having a curvature, or a flexible display apparatus with an adjustable curvature. An output resolution of the image display apparatus 100 may be, for example, a high definition (HD), a full HD, an ultra HD, or a resolution that is higher than an ultra HD.

The image display apparatus 100 may operate in an ambient mode. The ambient mode is a function of displaying an image such as a drawing or a picture, or displaying living information such as the time, the weather, and news, when the image display apparatus 100 is actively reproducing content or being operated under control of the user. The image display apparatus 100 may provide various esthetic experiences to a user by outputting audio while displaying an image.

Audio according to an embodiment of the disclosure may include, but is not limited to, music and a sound (for example, a natural sound, an artificial sound, or a voice).

As shown in FIG. 1, the image display apparatus 100 may display a plurality of images. The plurality of images may be displayed on a background image, and the background image may be an image that is the same as or similar to a surrounding environment such as a wall on which the image display apparatus 100 is installed. However, the disclosure is not limited thereto.

The image display apparatus 100 may obtain semantic information and emotion information corresponding to each of the plurality of displayed images, by using one or more neural networks. Based on the obtained semantic information and the obtained emotion information, the image display apparatus 100 may determine at least one piece of audio and may output the determined at least one piece of audio together with the plurality of images. At this time, the image display apparatus 100 may determine audio corresponding to each of the plurality of images and may generate a playlist including the determined audio.

The image display apparatus 100 may determine a weight corresponding to each of the plurality of images by using one or more neural networks, and may determine at least one piece of audio, based on the determined weights.

For example, the image display apparatus 100 may obtain representative emotion information, based on the emotion information and weights corresponding to the plurality of images, and may determine at least one piece of audio, based on the representative emotion information. The image display apparatus 100 may obtain the representative emotion information in consideration of not only the plurality of images but also a background image. However, the disclosure is not limited thereto.

Figure 2:
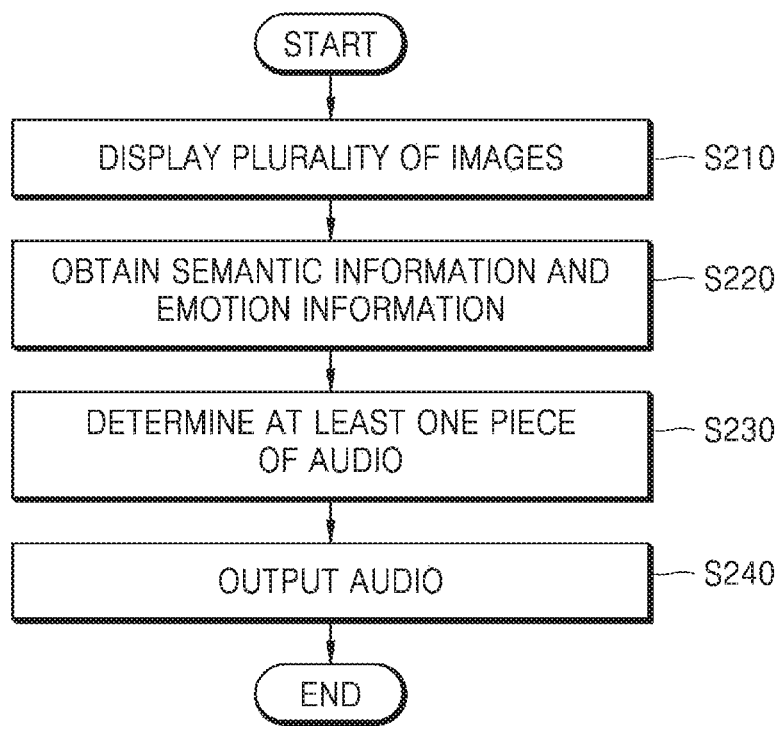
FIG. 2 illustrates a flowchart of a method of operating an image display apparatus according to an embodiment of the disclosure.

FIG. 2 illustrates a flowchart of a method of operating the image display apparatus 100, according to an embodiment of the disclosure.

Referring to FIG. 2, the image display apparatus 100 may display a plurality of images, in operation S210.

The image display apparatus 100 may obtain semantic information and/or emotion information corresponding to each of the plurality of images, in operation S220.

The image display apparatus 100 may obtain the semantic information corresponding to each of the plurality of displayed images, by using a first neural network. The first neural network may be a model trained to receive an image as input and output semantic information corresponding to the image. For example, the image display apparatus 100 may obtain semantic information about whether an image is an artwork or a photograph and whether the image is a landscape, an abstract painting, or a classic. However, the disclosure is not limited thereto.

The image display apparatus 100 may obtain the emotion information corresponding to each of the plurality of displayed images, by using a second neural network. The second neural network may be a model trained to receive an image as input and output emotion information corresponding to the image. For example, the image display apparatus 100 may obtain an emotion expressed by the image (for example, "happiness," "gladness," "anger," or "sadness"). However, the disclosure is not limited thereto.

The image display apparatus 100 may determine at least one piece of audio, based on the obtained semantic information and/or the obtained emotion information, in operation S230.

The image display apparatus 100 may determine at least one piece of audio corresponding to each of the plurality of displayed images, by using a third neural network. The third neural network may be a model trained to output at least one piece of audio when semantic information and emotion information are provided as input data.

The image display apparatus 100 may extract audio metadata (audio information), based on the semantic information. The audio metadata may include at least one of genre information, era information, or artist information of audio, etc. The image display apparatus 100 may determine at least one piece of audio, based on the audio metadata and the emotion information.

The image display apparatus 100 may also obtain representative emotion information corresponding to the plurality of images, and determine at least one piece of audio corresponding to the plurality of images, based on the representative emotion information and the semantic information corresponding to each of the plurality of images.

The image display apparatus 100 may output the determined at least one piece of audio, in operation S240.

For example, the image display apparatus 100 may output audio by using at least one of a speaker, a headphone output port, or a Sony/Philips Digital Interface (S/PDIF) output port, but the disclosure is not limited thereto.

Figure 3:
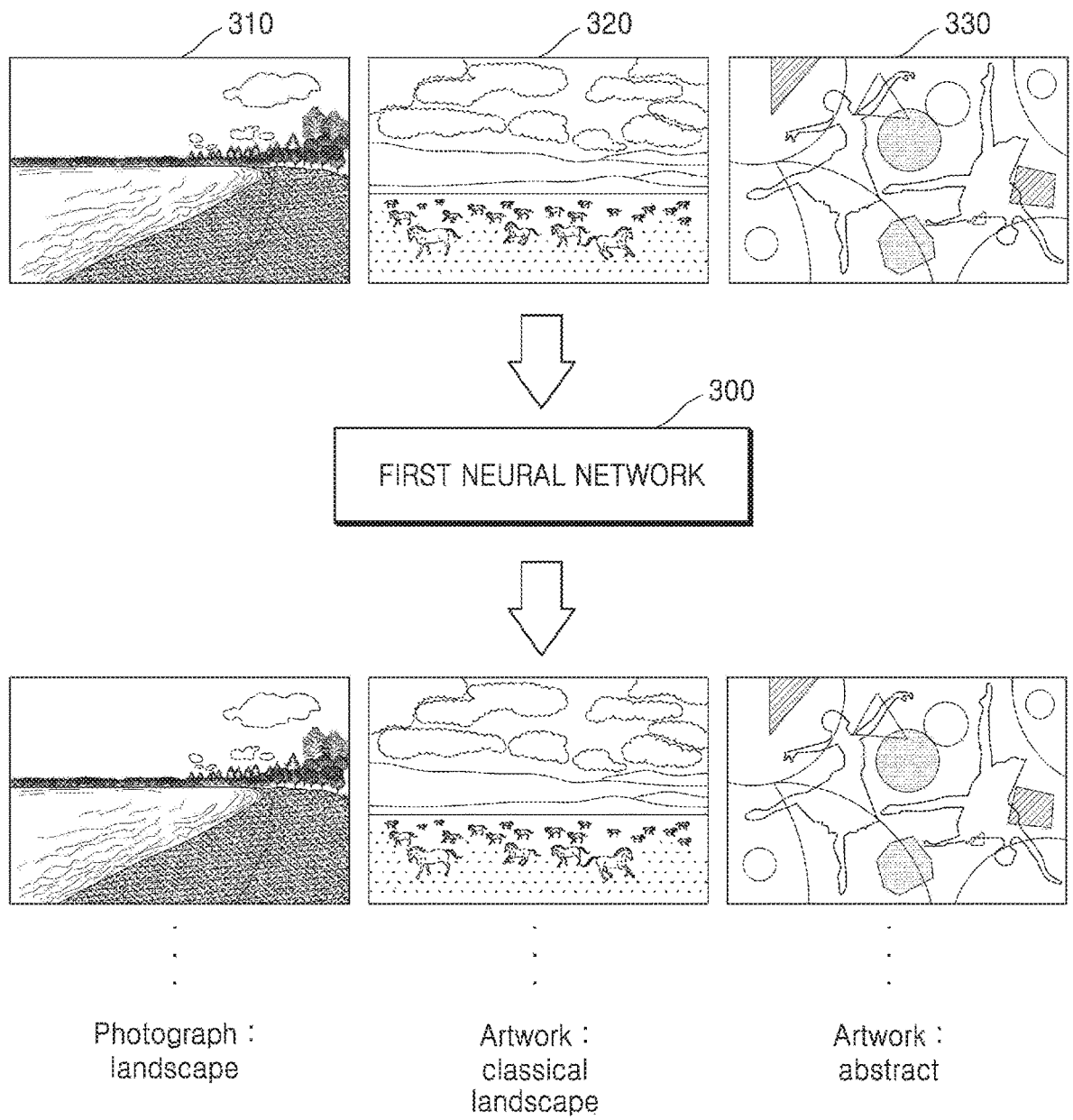
FIG. 3 illustrates a method, performed by an image display apparatus, of obtaining semantic information, according to an embodiment of the disclosure.

FIG. 3 illustrates a method, performed by the image display apparatus 100, of obtaining semantic information, according to an embodiment of the disclosure.

Referring to FIG. 3, the image display apparatus 100 may obtain pieces of semantic information respectively corresponding to a plurality of images 310, 320, 330, by a first neural network 300.

Semantic information may include semantic information that is extracted from an image. For example, the semantic information may include information about whether the image is an artwork or a photograph, and information (for example, an abstract painting, realism, a landscape, a family, a travel, and sports) about classification of the image or an object expressed by the image. However, the disclosure is not limited thereto.

The first neural network 300 may be a model trained to receive an image as input and output semantic information corresponding to the image. The first neural network 300 may have a structure in which data (for example, input data) is input and processed while passing through hidden layers and thus processed data is output. The first neural network 300 may be a deep neural network (DNN) including two or more hidden layers. The image display apparatus 100 may extract "features" such as outlines, lines, and colors, from an image, by using the first neural network 300. For example, the image display apparatus 100 may extract features based on the color of an image, features based on a shape shown on the image, and features based on a foreground or background shown on the image.

Each of the hidden layers included in the first neural network 300 may receive data, process the received data, and generate output data. For example, a first feature map may be generated by performing an operation (for example, a convolution operation) with respect to an image input to a first hidden layer and one or more weights, and a second feature map may be generated by inputting the first feature map to a second hidden layer and performing an operation with respect to the first feature map and the one or more weights.

Accordingly, by using the first neural network 300, the image display apparatus 100 may extract features of the image, classify the image into an artwork or a photograph, and may extract different pieces of semantic information according to whether the image is an artwork or a photograph. For example, a first image 310 may be classified into a photograph, based on features extracted from the first image 310, and semantic information of the first image 310 may be determined to be "landscape." A second image 320 may be classified into an artwork, based on features extracted from the second image 320, and semantic information of the second image 320 may be determined to be "classical" and "landscape." A third image 330 may be classified into an artwork, based on features extracted from the third image 330, and semantic information of the third image 330 may be determined to be "abstract." Semantic information may also include information about whether an image is an artwork or a photograph.

The first neural network 300 may include a plurality of neural networks. For example, the first neural network 300 may include one or more neural networks for extracting features from an image, and one or more neural networks for determining semantic information, based on the features. However, the disclosure is not limited thereto.

Figure 4:
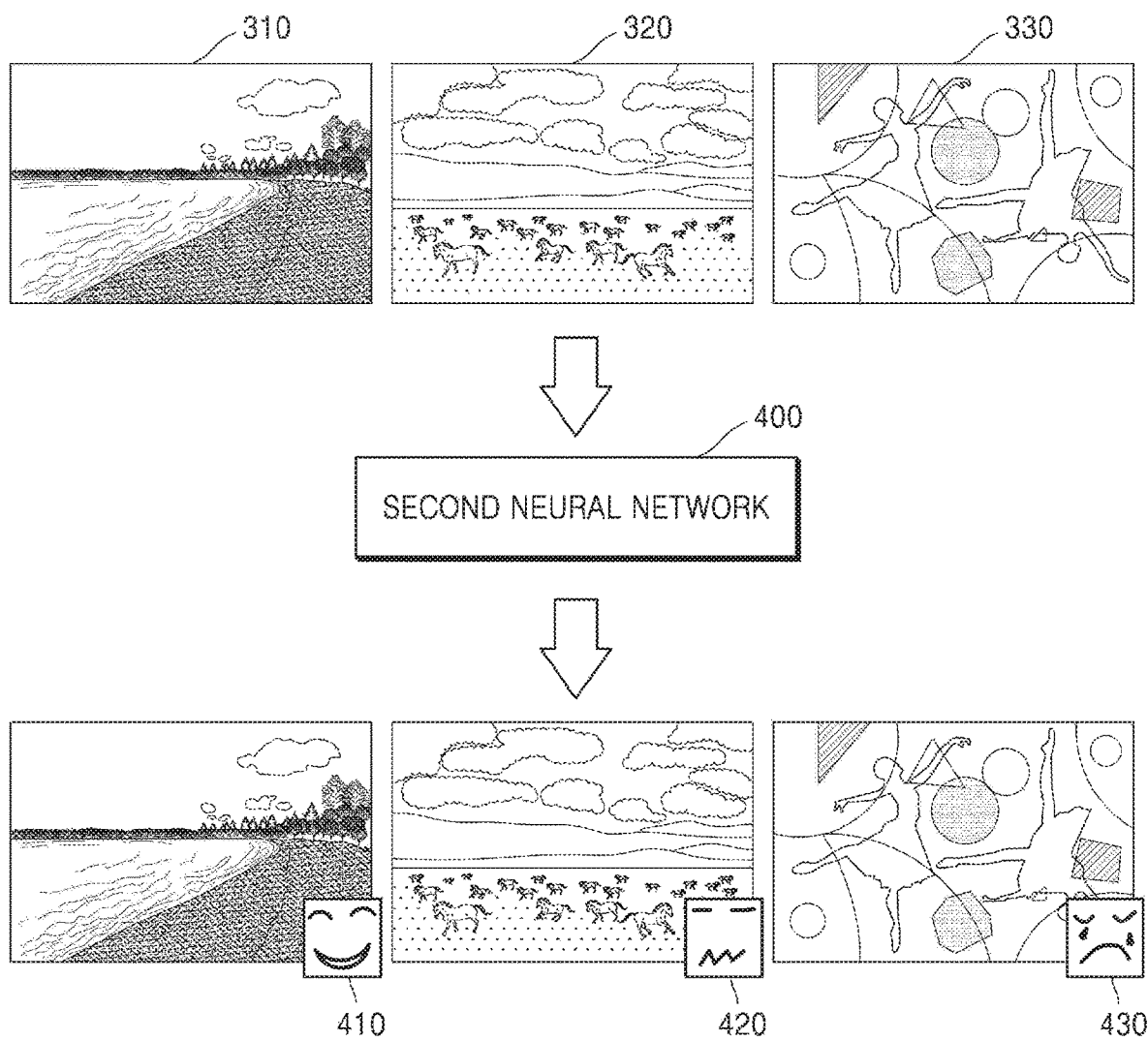
FIG. 4 illustrates a method, performed by an image display apparatus, of obtaining emotion information, according to an embodiment of the disclosure.

FIG. 4 illustrates a method, performed by the image display apparatus 100, of obtaining emotion information, according to an embodiment of the disclosure.

Referring to FIG. 4, the image display apparatus 100 may obtain pieces of emotion information respectively corresponding to a plurality of images 310, 320, 330, by using a second neural network 400.

Emotion information may be information indicating an emotion that is expressed by an image. For example, emotions, such as "happiness," "gladness," "anger," and "sadness," may be included.

The second neural network 400 may be a model trained to receive an image as input and output emotion information corresponding to the image. The second neural network 400 may have a structure in which data (for example, input data) is input and processed while passing through hidden layers and thus processed data is output. The second neural network 400 may be a DNN including two or more hidden layers. The image display apparatus 100 may extract "features," such as outlines, lines, and colors, from an image, by using the second neural network 400. For example, the image display apparatus 100 may extract features based on the color of an image, features based on a shape shown on the image, and features based on a foreground or background shown on the image.

Each of the hidden layers included in the second neural network 400 may extract features from an image, and the second neural network 400 may determine an emotion shown on the image by using the extracted features.

For example, the image display apparatus 100 may determine emotion information of the first image 310 to be "happiness" 410, based on features extracted from the first image 310 (for example, a color, a shape, and the like included in the first image 310). The image display apparatus 100 may also determine emotion information of the second image 320 to be "depression" 420, based on features extracted from the second image 320. The image display apparatus 100 may also determine emotion information of the third image 330 to be "sadness" 430, based on features extracted from the third image 330.

Figure 5:
FIG. 5 illustrates a metadata table of audio according to an embodiment of the disclosure.

FIG. 5 illustrates a metadata table 500 of audio according to an embodiment of the disclosure.

The image display apparatus 100 may extract audio metadata (audio information), based on the semantic information obtained in FIG. 3. For example, by using the metadata table 500 of FIG. 5, the image display apparatus 100 may extract the audio metadata corresponding to the semantic information. For example, when semantic information of an image is "artwork" and "abstract," audio metadata corresponding to the semantic information may be determined to be genre 1, era information (1600-1700), and artist 1.

When semantic information of an image is "photograph" and "landscape," audio metadata corresponding to the semantic information may be determined to be genre n, era information (2000), and artist n.

The image display apparatus 100 may determine the audio metadata by using a model trained to output audio metadata corresponding to semantic information input as input data, instead of using an audio metadata table. However, the disclosure is not limited thereto.

Figure 6:
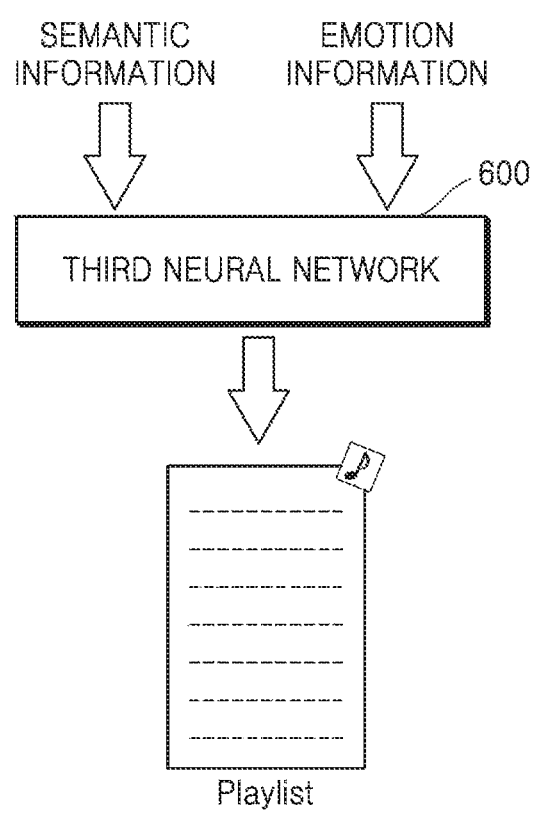
FIG. 6 illustrates a diagram of a method, performed by an image display apparatus, of determining at least one piece of audio, according to an embodiment of the disclosure.

FIG. 6 illustrates a diagram of a method, performed by the image display apparatus 100, of determining at least one piece of audio, according to an embodiment of the disclosure.

Referring to FIG. 6, the image display apparatus 100 may determine at least one piece of audio, based on semantic information and emotion information corresponding to an image. In this case, the image display apparatus 100 may determine at least one piece of audio by using a third neural network 600. For example, the third neural network 600 may be a model trained to output at least one piece of audio when semantic information and emotion information are input as input data. The third neural network 600 may have a structure in which input data (for example, semantic information and emotion information) is input and passes through hidden layers and thus output data (for example, at least one piece of audio) is output. The third neural network 600 may be a DNN including two or more hidden layers. Each of the hidden layers included in the third neural network 600 may receive data, process the received data, and generate output data.

Accordingly, the image display apparatus 100 may determine at least one piece of audio by inputting semantic information and emotion information to the third neural network 600. The image display apparatus 100 may generate a playlist including the determined at least one piece of audio.

Alternatively, the image display apparatus 100 may determine at least one piece of audio, based on audio metadata and emotion information. For example, the third neural network 600 may be a model trained to output at least one piece of audio when audio metadata and emotion information are input as input data, and the image display apparatus 100 may determine at least one piece of audio by inputting audio metadata and emotion information to the third neural network 600. The image display apparatus 100 may generate a playlist including the determined at least one piece of audio.

Figure 7:
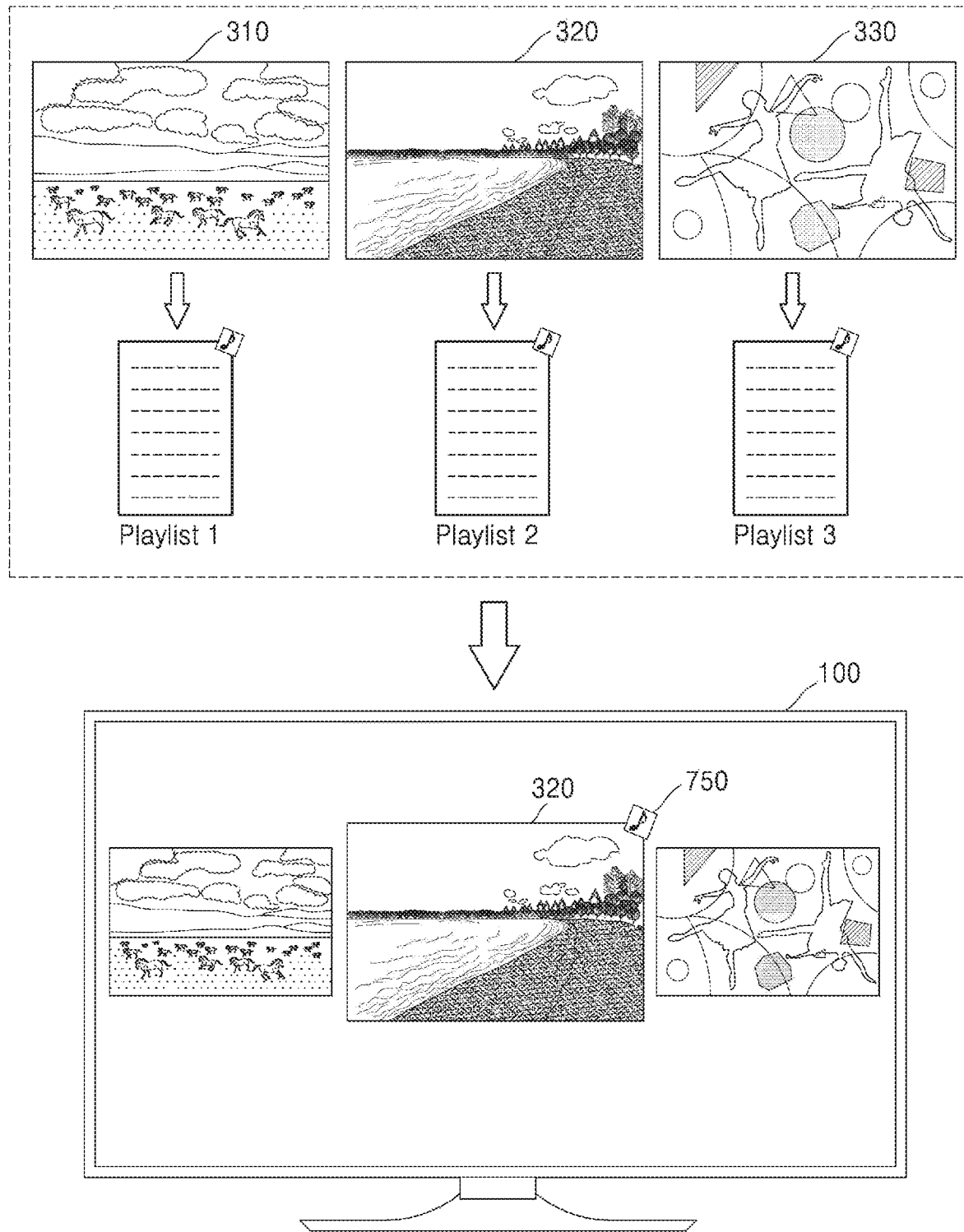
FIG. 7 illustrates a diagram of a method by which an image display apparatus generates a playlist corresponding to each of a plurality of images, according to an embodiment of the disclosure.

FIG. 7 illustrates a diagram of a method in which the image display apparatus 100 generates a playlist corresponding to each of a plurality of images, according to an embodiment of the disclosure.

Referring to FIG. 7, the image display apparatus 100 may display the first, second, and third images 310, 320, and 330. The image display apparatus 100 may obtain semantic information and emotion information corresponding to each of the first, second, and third images 310, 320, and 330, by using the first neural network 300 and the second neural network 400.

For example, the image display apparatus 100 may obtain first semantic information and first emotion information corresponding to the first image 310. The image display apparatus 100 may also obtain second semantic information and second emotion information corresponding to the second image 320 and third semantic information and third emotion information corresponding to the third image 330.

The image display apparatus 100 may determine at least one piece of audio corresponding to the first image 310, based on the first semantic information and the first emotion information, and may generate a first playlist (playlist 1) including the at least one piece of audio. The image display apparatus 100 may also determine at least one piece of audio corresponding to the second image 320, based on the second semantic information and the second emotion information, and may generate a second playlist (playlist 2) including the at least one piece of audio. The image display apparatus 100 may also determine at least one piece of audio corresponding to the third image 330, based on the third semantic information and the third emotion information, and may generate a third playlist (playlist 3) including the at least one piece of audio.

The image display apparatus 100 may output the at least one piece of audio included in each of the first, second, and third playlists (playlist 1, playlist 2, and playlist 3) while displaying the first, second, and third images 310, 320, and 330. For example, the image display apparatus 100 may sequentially output the pieces of audio included in the first, second, and third playlists (playlist 1, playlist 2, and playlist 2), or may output the at least one piece of audio included in a playlist selected based on a user input (for example, the second playlist (playlist 2)). However, the disclosure is not limited thereto.

The image display apparatus 100 may magnify and display an image corresponding to audio currently being output (reproduced), or may display a specific object on the image corresponding to the audio currently being output (reproduced). For example, as shown in FIG. 7, when audio included in the second playlist is being reproduced, the image display apparatus 100 may magnify and display the second image 320 corresponding to the second playlist. The image display apparatus 100 may also display a note object 750. However, the disclosure is not limited thereto.

Figure 8:
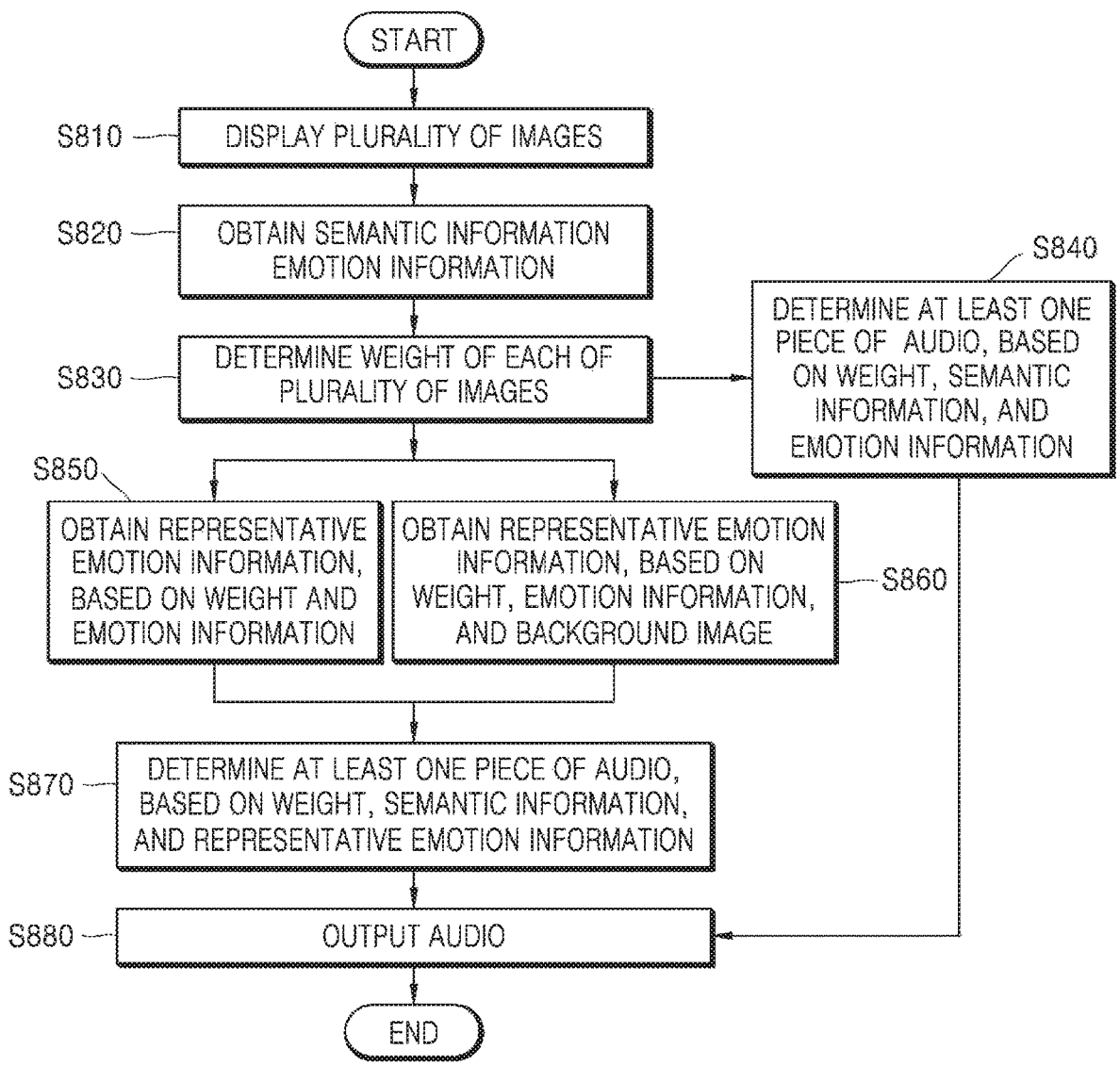
FIG. 8 illustrates a flowchart of a method, performed by an image display apparatus, of determining and outputting at least one piece of audio corresponding to a plurality of images, according to an embodiment of the disclosure.

FIG. 8 illustrates a flowchart of a method, performed by the image display apparatus 100, of determining and outputting at least one piece of audio corresponding to a plurality of images, according to an embodiment of the disclosure.

Referring to FIG. 8, the image display apparatus 100 may display the plurality of images, in operation S810.

The image display apparatus 100 may obtain semantic information and emotion information corresponding to each of the plurality of images, in operation S820.

Because operation S820 of FIG. 8 corresponds to operation S220 of FIG. 2, a repeated description thereof is omitted.

The image display apparatus 100 may determine a weight of each of the plurality of images, in operation S830.

The image display apparatus 100 may determine the weight of each of the plurality of images, by using a fourth neural network. For example, the plurality of images may represent various emotions, the various emotions may be recognized with different intensities, and different weights may be applied according to the degree of recognition.

The fourth neural network may be a model trained to receive an image as input data and output a weight corresponding to emotion information of the image. Alternatively, the fourth neural network may be a model trained to receive emotion information and/or the image as input data and output a weight corresponding to the emotion information. However, the disclosure is not limited thereto.

The image display apparatus 100 may determine at least one piece of audio, based on the weight, the semantic information, and the emotion information corresponding to each of the plurality of images, in operation S840.

For example, the image display apparatus 100 may determine at least one piece of audio (first audio), based on first semantic information and first emotion information corresponding to a first image, determine at least one piece of audio (second audio), based on second semantic information and second emotion information corresponding to a second image, and determine at least one piece of audio (third audio), based on third semantic information and third emotion information corresponding to a third image. The image display apparatus 100 may generate a playlist including the determined pieces of audio. At this time, a ratio between the numbers of pieces of first, second, and third audio included in the playlist may be determined based on first, second, and third weights.

The image display apparatus 100 may obtain representative emotion information, based on the weight and emotion information corresponding to each of the plurality of images, in operation S850. This will be described in greater detail later with reference to FIG. 12.

The image display apparatus 100 may obtain representative emotion information, based on the weight, the emotion information, and a background image corresponding to each of the plurality of images, in operation S860. This will be described in greater detail later with reference to FIG. 14.

The image display apparatus 100 may determine at least one piece of audio, based on the weight, the semantic information, and the representative emotion information corresponding to each of the plurality of images, in operation S870.

For example, the image display apparatus 100 may determine at least one piece of audio (first audio), based on the first semantic information corresponding to the first image and the representative emotion information, determine at least one piece of audio (second audio), based on the second semantic information corresponding to the second image and the representative emotion information, and determine at least one piece of audio (third audio), based on the third semantic information corresponding to the third image and the representative emotion information. The image display apparatus 100 may generate a playlist including the determined pieces of audio. At this time, a ratio between the numbers of pieces of first, second, and third audio included in the playlist may be determined based on first, second, and third weights.

The image display apparatus 100 may output the determined at least one piece of audio, in operation S880.

Figure 9:
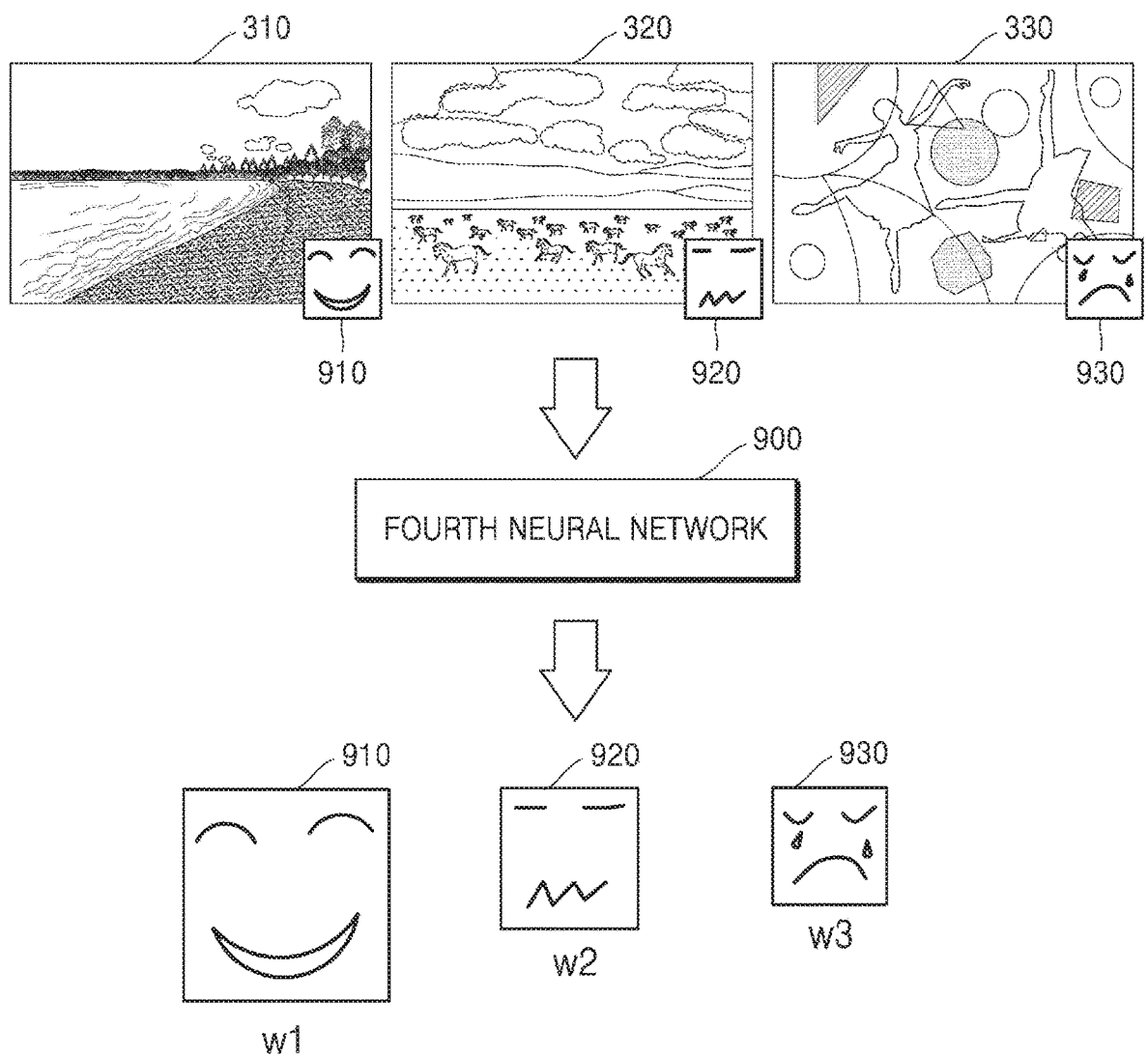
FIG. 9 illustrates a diagram of a method by which an image display apparatus determines a weight corresponding to each of a plurality of images, according to an embodiment of the disclosure.

FIG. 9 illustrates a diagram of a method in which the image display apparatus 100 determines a weight corresponding to each of a plurality of images, according to an embodiment of the disclosure.

Referring to FIG. 9, the image display apparatus 100 may obtain the weight corresponding to each of the plurality of images, by using a fourth neural network 900.

For example, the plurality of images may represent various emotions, the various emotions may be recognized as having different intensities, and different weights may be applied according to the degree of recognition.

The fourth neural network 900 may be a model trained to receive an image as input data and output a weight corresponding to emotion information of the image. Alternatively, the fourth neural network may be a model trained to receive emotion information as input data and output a weight corresponding to the emotion information. The fourth neural network 900 may be a model including a visual-emotion saliency model, or may be a model that learns recognition intensities of emotions and determines weights for the emotions. However, the disclosure is not limited thereto.

For example, when a "happiness" emotion 910 corresponding to the first image 310 is recognized as having greater intensity than a "depression" emotion 920 corresponding to the second image 320, a first weight w1 corresponding to the first image 310 may be determined to be larger than a second weight w2 corresponding to the second image 320. When the "depression" emotion 920 corresponding to the second image 320 is recognized as having greater intensity than a "sadness" emotion 930 corresponding to the third image 330, a third weight w3 corresponding to the third image 330 may be determined to be smaller than the second weight w2 corresponding to the second image 320. However, the disclosure is not limited thereto.

Figure 10:
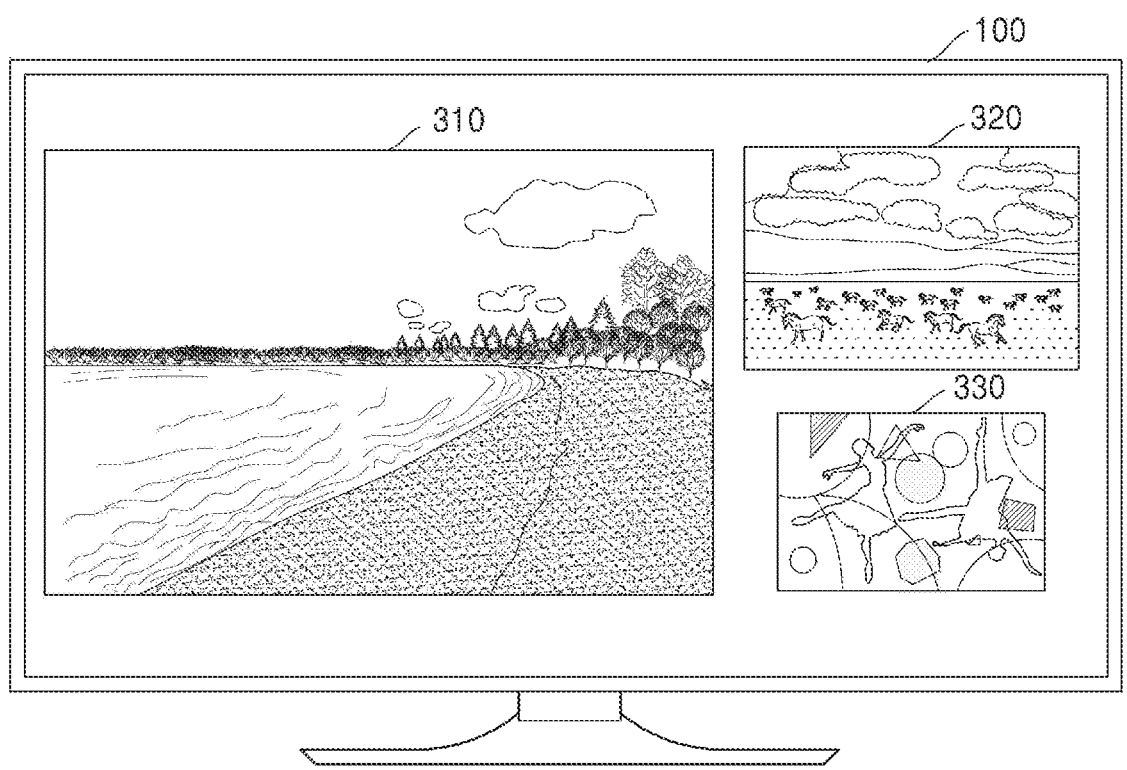
FIG. 10 illustrates an image display apparatus displaying a plurality of images, based on weights, according to an embodiment of the disclosure.

FIG. 10 illustrates an example in which the image display apparatus 100 displays a plurality of images, based on weights, according to an embodiment of the disclosure.

Referring to FIG. 10, the image display apparatus 100 may determine the sizes of the plurality of images, based on weights respectively corresponding to the plurality of images, namely, the first, second, and third images 310, 320, and 330.

The weight of the first image 310 may be determined to be w1, the weight of the second image 320 may be determined to be w2, and the weight of the third image 330 may be determined to be w3. The image display apparatus 100 may determine the size of an image that is to be displayed, according to the size of a weight. For example, when w1>w2>w3, the sizes of the plurality of images may be determined such that size S1 of the first image>size S2 of the second image>size S3 of the third image is established.

The image display apparatus 100 may adjust the sizes S1, S2, and S3 of the first, second, and third images 310, 320, and 330 to be proportional to the first, second, and third weights w1, w2, and w3. For example, if S is a size or an area, the size S1 of the first image 310 may be w1*S, the size S2 of the second image 320 may be w2*S, and the size S3 of the third image 330 may be w3*S.

The image display apparatus 100 may also adjust brightness of each of the first, second, and third images 310, 320, and 330, according to the first, second, and third weights w1, w2, and w3. For example, when w1>w2>w3, the image display apparatus 100 may adjust the brightness of the first image 310 to be highest, and adjust the brightness of the third image 330 to be lowest.

The image display apparatus 100 may adaptively adjust not only the size or brightness of each of the plurality of images but also the other characteristics of each of the plurality of images, according to the weights.

Figure 11:
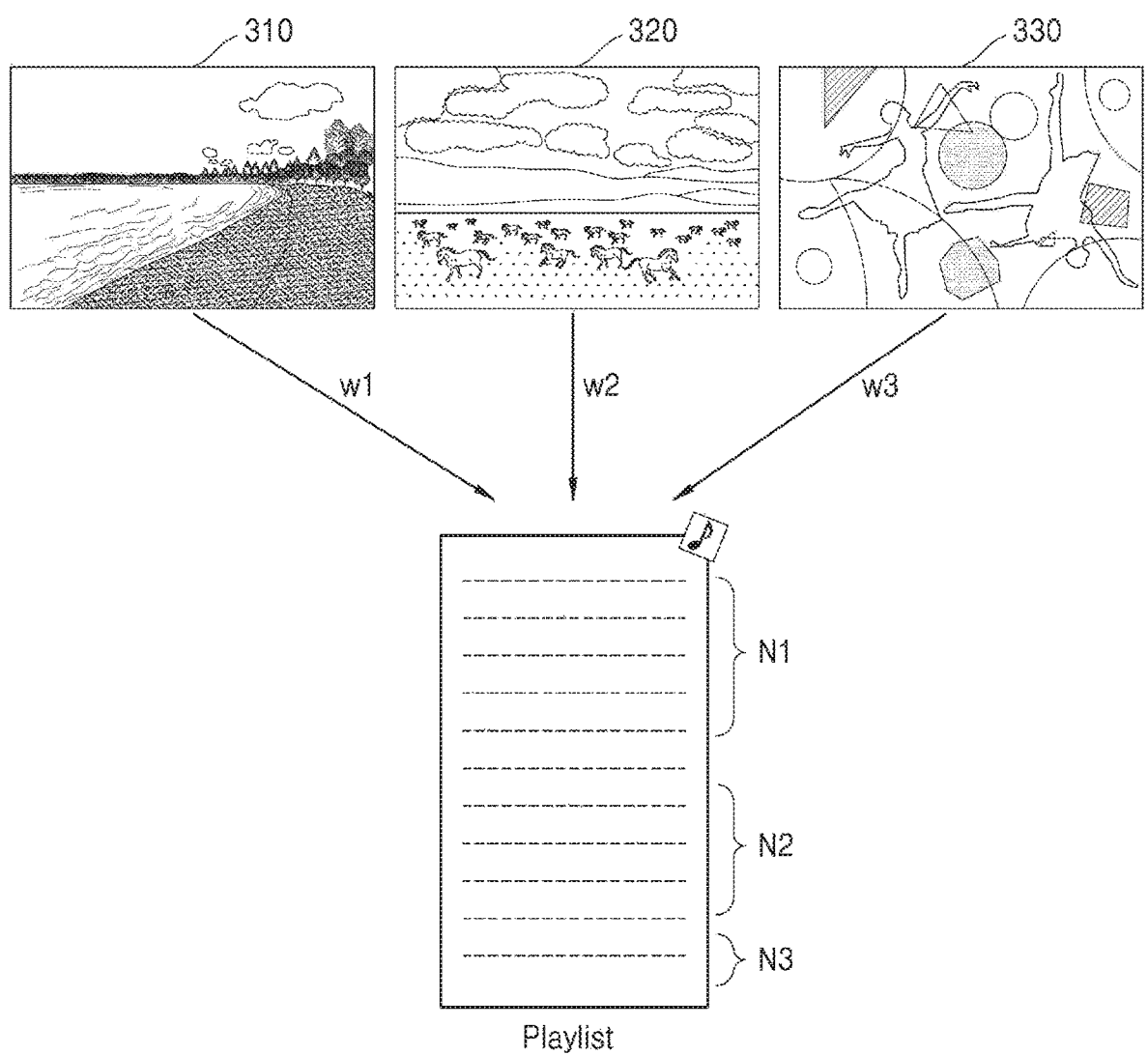
FIG. 11 illustrates a method, performed by an image display apparatus, of generating a playlist, according to an embodiment of the disclosure.

FIG. 11 illustrates a method, performed by the image display apparatus 100, of generating a playlist, according to an embodiment of the disclosure.

Referring to FIG. 11, the respective weights of the plurality of images may be determined as the first, second, and third weights w1, w2, and w3. As described above with reference to FIG. 9, the image display apparatus 100 may determine the respective weights of the plurality of images, by using the fourth neural network 900.

The image display apparatus 100 may generate the playlist, based on the semantic information, the emotion information, and the weight corresponding to each of the plurality of images. For example, the image display apparatus 100 may determine at least one piece of audio, based on the first semantic information and the first emotion information corresponding to the first image 310.

At this time, the image display apparatus 100 may determine the number of pieces of audio that is determined based on the first semantic information and the first emotion information, based on the overall number of pieces of audio included in the playlist and the first, second, and third weights w1, w2, and w3. For example, when the overall number of pieces of audio included in the playlist is N and the first, second, and third weights w1, w2, and w3 are respectively 0.6, 0.3, and 0.1, the image display apparatus 100 may determine N1 (=0.6*N) pieces of audio, based on the first semantic information and the first emotion information. The image display apparatus 100 may also determine N2 (=0.3*N) pieces of audio, based on the second semantic information and the second emotion information corresponding to the second image 320, and may determine N3 (=0.1*N) pieces of audio, based on the third semantic information and the third emotion information corresponding to the third image 330.

For example, the first semantic information and the second semantic information are "classical" and the third semantic information is "modern," 90% of the overall number of pieces of audio included in the playlist may have a classic music genre, and 10% thereof may have a modern music genre. When the first emotion information is "happy"

and the second emotion information and the third emotion information are "sad," 60% of the overall number of pieces of audio included in the playlist may have a quick and light rhythm or tempo, and 40% thereof may have a slow and heavy rhythm or tempo. However, the disclosure is not limited thereto.

Figure 12:
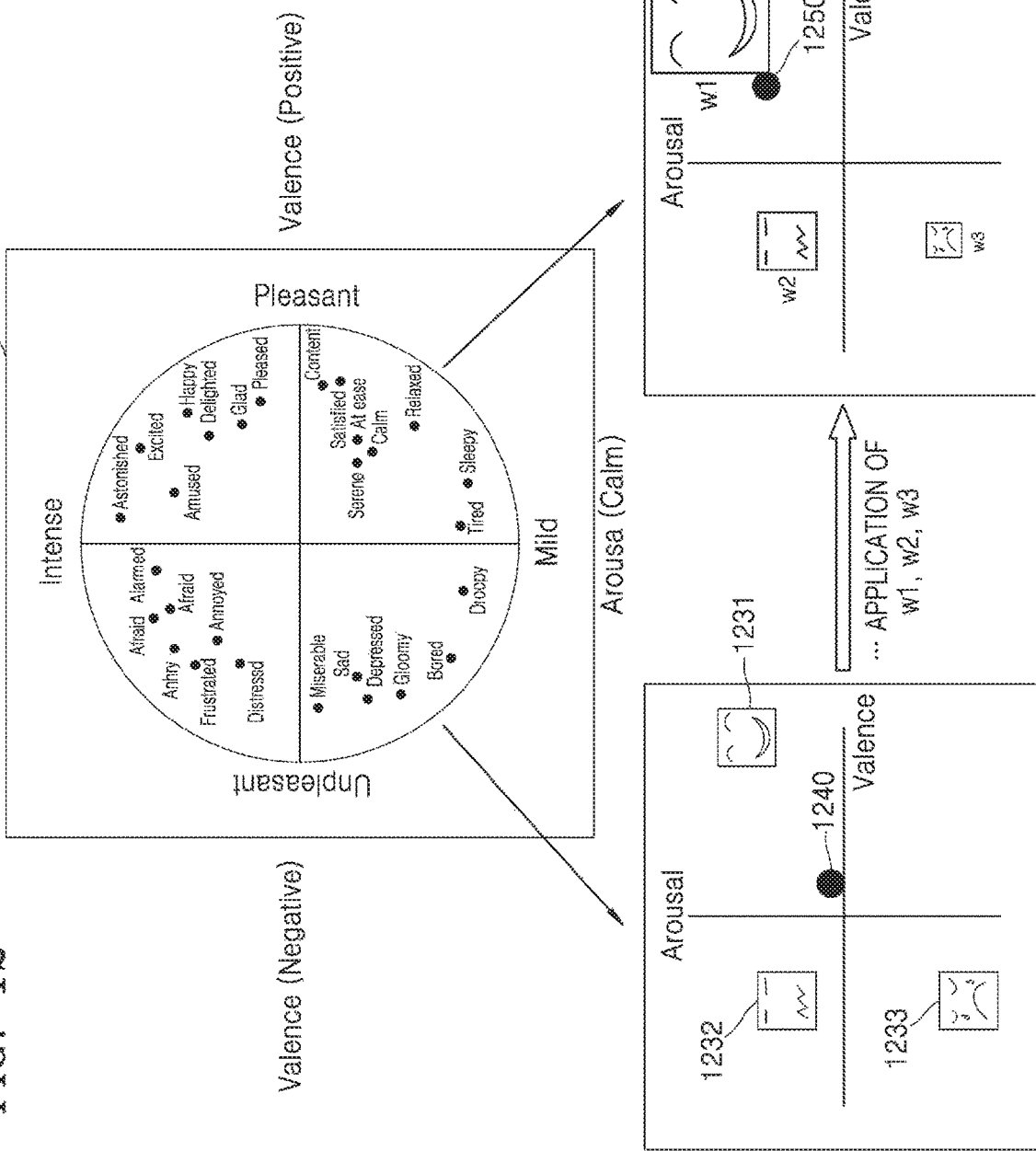
FIG. 12 illustrates a method, performed by an image display apparatus, of obtaining representative emotion information, according to an embodiment of the disclosure.

FIG. 12 illustrates a method, performed by the image display apparatus 100, of obtaining representative emotion information, according to an embodiment of the disclosure.

An emotion graph 1210 of FIG. 12 is a graph showing emotions of a human being as coordinates mapped according to the criteria of arousal and valence. For example, the image display apparatus 100 may determine the location of an emotion on a coordinate system, according to the degree of arousal of the emotion and whether the arousal is positive or negative. For example, emotions, such as "happy," "pleased," and "satisfied," may have positive values in the valence axis, and emotions, such as "angry," "depressed," and "sad," may have negative values in the valence axis. Emotions, such as "astonished," "afraid," "angry," may have positive values in the arousal axis, and emotions, such as "tired," "sleepy," and "bored," may have negative values in the arousal axis.

For example, the "happy" emotion has positive values in both the arousal axis and the valence axis.

The image display apparatus 100 may obtain representative emotion information, based on the pieces of emotion information respectively corresponding to the plurality of images. For example, as illustrated in FIG. 12, the pieces of emotion information respectively corresponding to the plurality of images may be displayed on the coordinate system by using the emotion graph 1210. For example, a first emotion 1231 corresponding to a first image may be displayed at a first location, a second emotion 1232 corresponding to a second image may be displayed at a second location, and a third emotion 1233 corresponding to a third image may be displayed at a third location. The image display apparatus 100 may calculate a representative location 1240 (representative value) for the first, second, and third locations. For example, the image display apparatus 100 may calculate the representative location 1240 (representative value) by using an average, an Euclidean distance, and the like, but the disclosure is not limited thereto. When the representative location 1240 (representative value) is calculated, the image display apparatus 100 may determine an emotion corresponding to the representative location 1240 as a representative emotion of the first, second, and third images.

The image display apparatus 100 may obtain the representative emotion information, based on the respective weights of the plurality of images. For example, when the image display apparatus 100 calculates a representative location (representative value) for the first, second, and third locations, the image display apparatus 100 may calculate the representative location by applying the weights, and may determine an emotion corresponding to a calculated representative location 1250 as the representative emotion of the first, second, and third images. For example, the image display apparatus 100 may determine the "glad" emotion corresponding to the representative location 1250 as the representative emotion of the first, second, and third images.

The image display apparatus 100 may generate a playlist by using the representative emotion information. For example, the image display apparatus 100 may determine at least one piece of audio, based on the first semantic information corresponding to the first image and the representative emotion information, determine at least one piece of audio, based on the second semantic information corresponding to the second image and the representative emotion information, and determine at least one piece of audio, based on the third semantic information corresponding to the third image and the representative emotion information. At this time, a ratio between music genres of the pieces of audio included in the playlist may be determined based on the first, second, and third weights.

For example, when the representative emotion information is "glad," the first semantic information and the second semantic information are "classical," the third semantic information is "modern," and the first, second, and third weights w1, w2, and w3 are respectively 0.6, 0.3, and 0.1, 90% of the pieces of audio included in the playlist may have a classic music genre, and 10% thereof may have a modern music genre. All of the pieces of audio included in the playlist may be pieces of audio having a light and quick rhythm or tempo (pieces of audio representing a glad emotion). However, the disclosure is not limited thereto.

Figure 13:
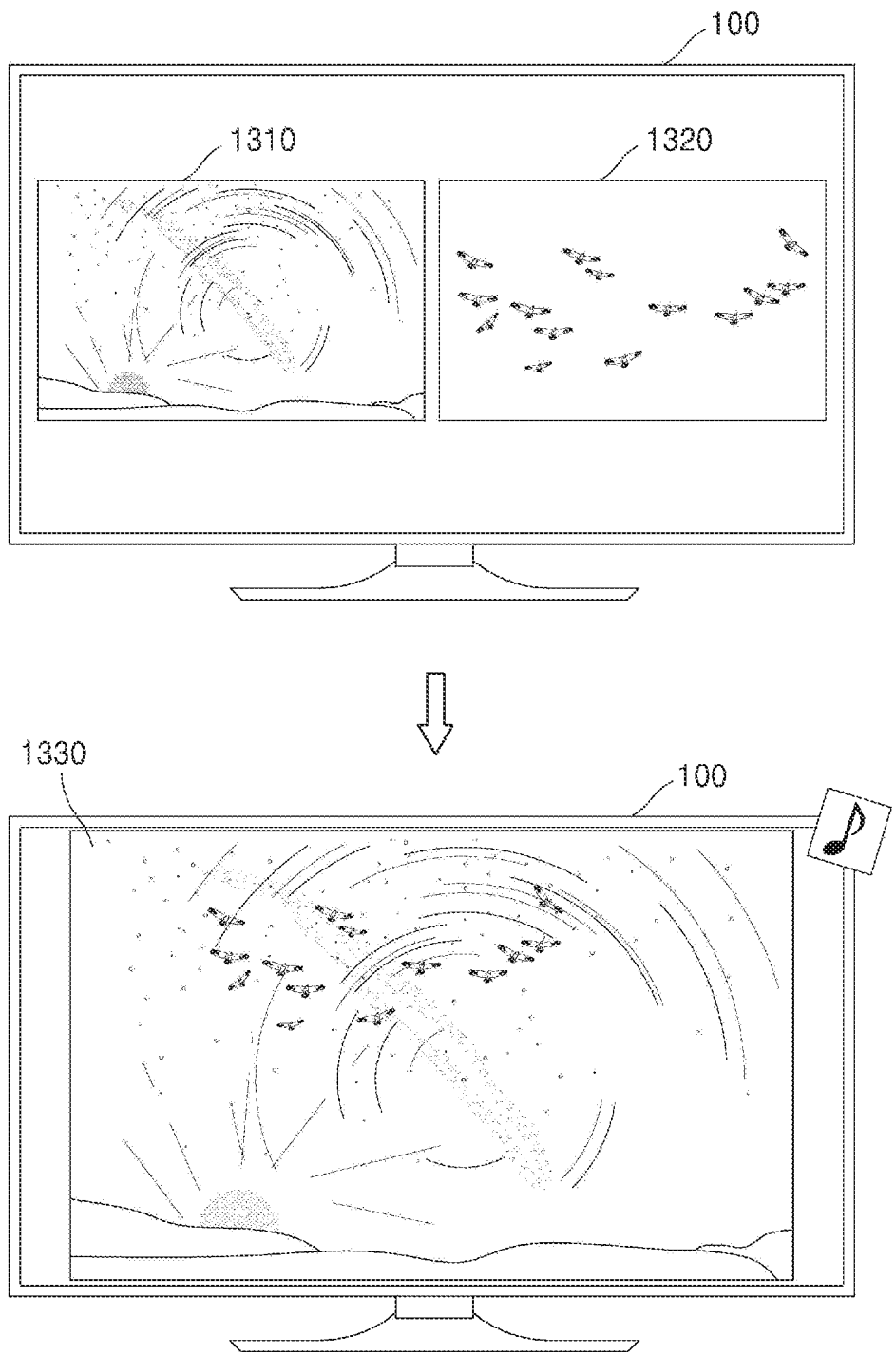
FIG. 13 illustrates a method, performed by an image display apparatus, of generating a representative image, according to an embodiment of the disclosure.

FIG. 13 illustrates a method, performed by the image display apparatus 100, of generating a representative image, according to an embodiment of the disclosure.

Figure 14:
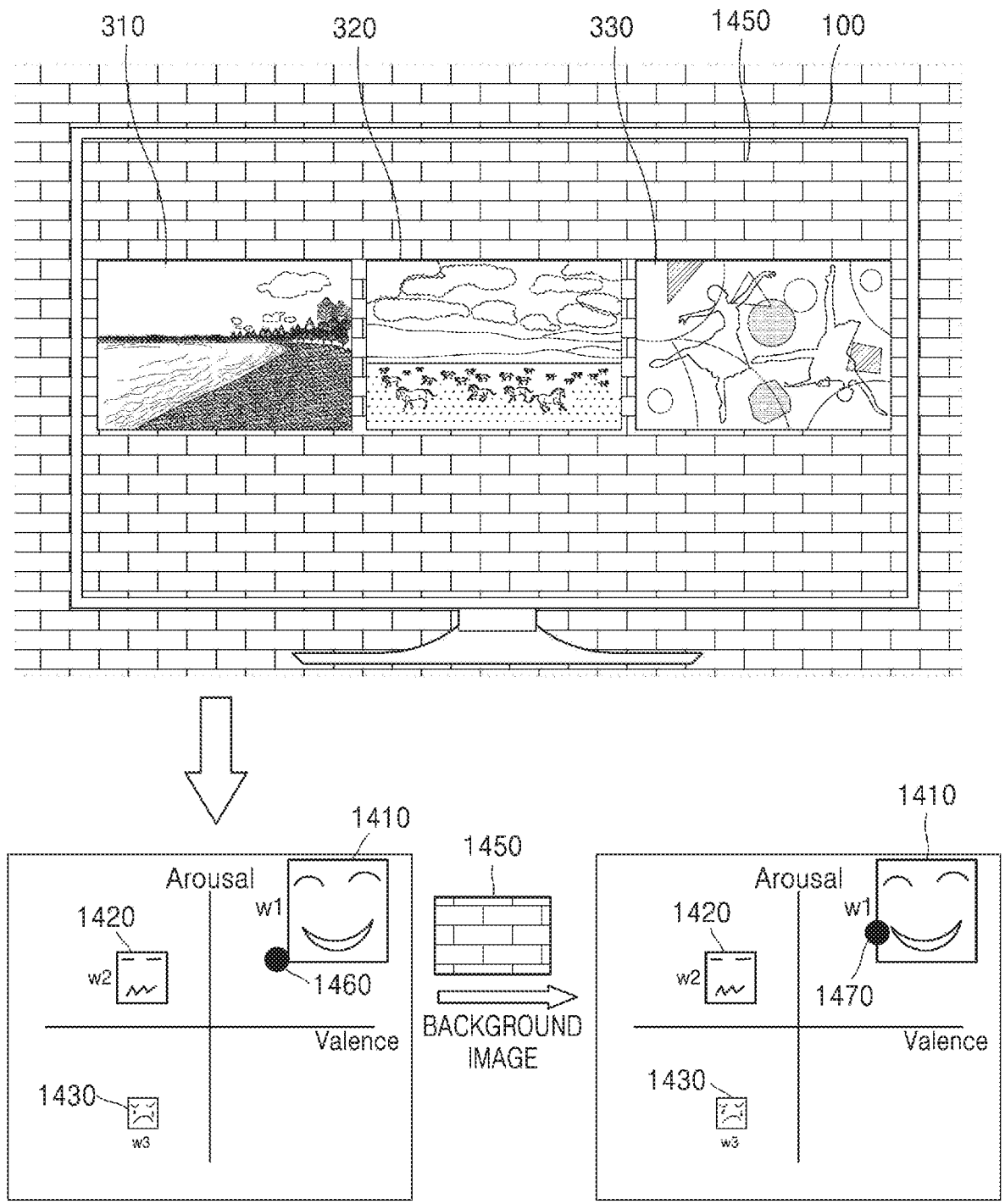
FIG. 14 illustrates a diagram of a method by which an image display apparatus obtains representative emotion information, based on a background image, according to an embodiment of the disclosure.

Referring to FIG. 13, the image display apparatus 100 may generate the representative image, based on respective weights of a plurality of images. For example, the image display apparatus 100 may synthesize a first image 1310 with a second image 1320 by applying a first weight corresponding to the first image 1310 and a second weight corresponding to the second image 1320. As shown in FIG. 14, when the first weight is greater than the second weight, the image display apparatus 100 may synthesize birds included in the second image 1320 with a portion of the first image 1310, while using the first image 1310 as the entire image, to thereby generate and display a third image 1330. However, the disclosure is not limited thereto.

The image display apparatus 100 may generate the representative image, based on representative emotion information. The representative emotion information may be calculated using the method of FIG. 12. For example, the image display apparatus 100 may generate a representative image by effects, such as, a color, a shade, and brightness, indicating the representative emotion information, to the third image 1330 obtained by synthesizing the first image 1310 with the second image 1320.

While displaying the representative image, the image display apparatus 100 may output at least one piece of determined audio, based on representative emotion information corresponding to the first and second images 1310 and 1320, semantic information of the first image 310, semantic information of the second image 320, the first weight, and the second weight. The at least one piece of audio may be determined using the method of FIG. 12. However, the disclosure is not limited thereto.

FIG. 14 is a diagram of a method in which the image display apparatus 100 obtains representative emotion information, based on a background image, according to an embodiment of the disclosure.

Referring to FIG. 14, the image display apparatus 100 may obtain representative emotion information, based on the first, second, and third images 310, 320, and 330 and a background image 1450 on which the first, second, and third images 310, 320, and 330 are displayed.

For example, the image display apparatus 100 may determine a first representative emotion 1460, based on emotion information 1410 of the first image 310, emotion information 1420 of the second image 320, emotion information 1430 of the third image 330, and the first, second, and third weights w1, w2, and w3 respectively corresponding to the first, second, and third images 310, 320, and 330. The first representative emotion 1460 may be "glad." The image display apparatus 100 may determine a representative emotion in consideration of the pieces of emotion information 1410, 1420, and 1430 respectively corresponding to the first, second, and third images 310, 320, and 330 and also the background image 1450. The background image 1450 is displayed on the entire area of the image display apparatus 100, and, as shown in FIG. 14, the first, second, and third images 310, 320, and 330 may be displayed on the background image 1450.

The image display apparatus 100 may determine emotion information indicated by the background image 1450, based on a color and brightness of the background image 1450, shapes of the objects included in the background image 1450, and an arrangement of the objects. For example, when the background image 1450 has a red color and the objects included in the background image 1450 are arranged disorderedly, the image display apparatus 100 may determine emotion information corresponding to the background image 1450 to be "excited." The image display apparatus 100 may also determine a weight corresponding to the background image 1450 according to the emotion information corresponding to the background image 1450.

The image display apparatus 100 may determine a second representative emotion 1470, based on the pieces of emotion information and weights corresponding to the first, second, and third images 310, 320, and 330 and the emotion information and weight corresponding to the background image 1450. The second representative emotion 1470 may be "delighted."

Figure 15:
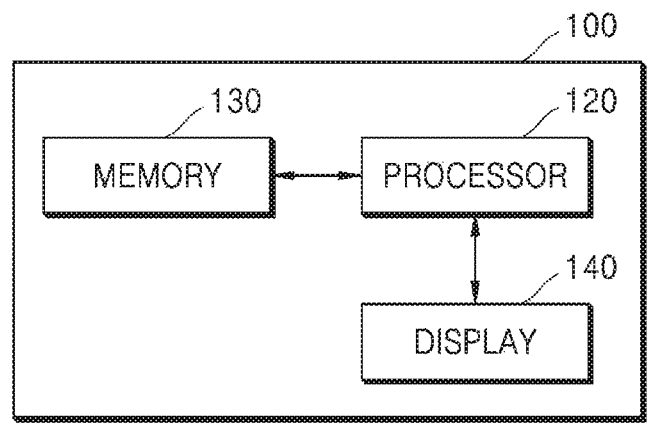
FIG. 15 illustrates a block diagram of a structure of an image display apparatus according to an embodiment of the disclosure.

FIG. 15 is a block diagram of a structure of the image display apparatus 100 according to an embodiment of the disclosure.

Referring to FIG. 15, the image display apparatus 100 may include a processor 120, a memory 130, and a display 140.

The processor 120 may execute one or more programs stored in the memory 130. The processor 120 may include a single core, a dual core, a triple core, a quad core, or a multiple core thereof. The processor 120 may include a plurality of processors. For example, the processor 120 may be implemented by using a main processor and a sub-processor operating in a sleep mode.

The memory 130 may store various pieces of data, programs, or applications for driving and controlling the image display apparatus 100.

A program stored in the memory 130 may include one or more instructions. A program (one or more instructions) or application stored in the memory 130 may be executed by the processor 120.

The processor 120 may execute one or more instructions of the program stored in the memory 130 to thereby obtain semantic information corresponding to each of a plurality of images by using a first neural network and obtain emotion information corresponding to each of the plurality of images by using a second neural network. The processor 120 may determine at least one piece of audio corresponding to the plurality of images, based on the obtained semantic information and the obtained emotion information. For example, the processor 120 may determine the at least one piece of audio by using a third neural network. Each of the first, second, and third neural networks may have a structure in which input data is processed while passing through hidden layers and thus processed data is output. In this case, the processor 120 may process data received from a previous layer in each of the hidden layers, and output the processed data to a next layer.

The processor 120 may obtain audio information, based on the semantic information, and may determine at least one piece of audio, based on the audio information and the emotion information.

The processor 120 may determine audio corresponding to each of the plurality of images, based on the semantic information and emotion information corresponding to each of the plurality of images, and may generate a playlist including the audio. The processor 120 may select at least one playlist from among playlists respectively corresponding to a plurality of playlists, based on a user input, and may control audio included in the selected playlist to be output.

The processor 120 may determine weights respectively corresponding to the plurality of images, based on pieces of emotion information respectively corresponding to the plurality of images, and may determine at least one piece of audio by applying the determined weights to at least one of the semantic information or the emotion information. For example, the processor 120 may obtain representative emotion information that is representative of the plurality of images, based on the emotion information and weights corresponding to the plurality of images, and may determine at least one piece of audio, based on the representative emotion information.

The processor 120 may obtain the representative emotion information, based on the pieces of emotion information and weights respectively corresponding to the plurality of images and emotion information and a weight corresponding to a background image on which the plurality of images are displayed, and may determine at least one piece of audio, based on the representative emotion information.

The display 140 may generate a driving signal by converting an image signal, a data signal, an on-screen display (OSD) signal, and a control signal that are processed by the processor 120. The display 140 may be a plasma display panel (PDP), a liquid-crystal display (LCD), an organic light-emitting device (OLED), a flexible display, or a 3-dimensional (3D) display. The display 140 may be configured as a touch screen, and thus may serve as an input device as well as an output device.

The display 140 may operate in an ambient mode to display an image (such as a drawing or a picture) or display living information (such as the time, the weather, and news) when the image display apparatus 100 is not watched. The display 140 may display the plurality of images and may display the plurality of images on the background image. The background image may be an image that is the same as or similar to a surrounding environment such as a wall on which the image display apparatus 100 is installed. However, the disclosure is not limited thereto.

Figure 16:
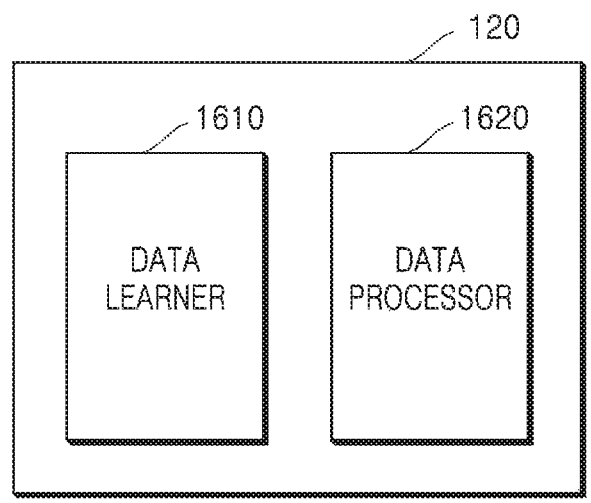
FIG. 16 illustrates a block diagram of a structure of a processor according to an embodiment of the disclosure.

FIG. 16 is a block diagram of a structure of the processor 120 according to an embodiment of the disclosure.

Referring to FIG. 16, the processor 120 may include a data learner 1610 and a data processor 1620.

The data learner 1610 may learn a criterion for obtaining semantic information from an image in order to train a first neural network according to an embodiment of the disclosure. The data learner 1610 may learn a criterion regarding what information (e.g., feature information) of an image is used to obtain semantic information. The data learner 1610 may learn a criterion regarding how to obtain semantic information, by using the feature information of an image. The data learner 1610 may learn a criterion for obtaining semantic information from an image, by obtaining data (e.g., an image) for use in learning and applying the obtained data to a data processing model (a first neural network).

The data learner 1610 may learn a criterion for obtaining emotion information from an image in order to train a second neural network according to an embodiment of the disclosure. The data learner 1610 may learn a criterion regarding what information (e.g., feature information) of an image is used to obtain emotion information. The data learner 1610 may learn a criterion regarding how to obtain emotion information, by using feature information of an image. The data learner 1610 may learn a criterion for obtaining emotion information from an image, by obtaining data (e.g., an image) for use in learning and applying the obtained data to a data processing model (a second neural network).

The data learner 1610 may learn a criterion for determining at least one piece of audio by using semantic information and emotion information, in order to train a third neural network according to an embodiment of the disclosure. The data learner 1610 may learn a criterion regarding how to determine at least one piece of audio by using semantic information and emotion information. The data learner 1610 may learn a criterion for determining at least one piece of audio, by obtaining data (e.g., semantic information and emotion information) for use in learning and applying the obtained data to a data processing model (a third neural network). The data learner 1610 may learn a criterion for determining at least one piece of audio by using audio metadata and emotion information, in order to train the third neural network.

The data learner 1610 may learn a criterion for determining a weight from an image, in order to train a fourth neural network according to an embodiment of the disclosure. The data learner 1610 may learn a criterion regarding how to determine a weight, by using an image or emotion information of the image. The data learner 1610 may learn a criterion for determining a weight, by obtaining data (e.g., an image or emotion information of the image) for use in learning and applying the obtained data to a data processing model (a fourth neural network).

The data processing models (e.g., the first through fourth neural networks) may be established in consideration of, for example, an application field of a recognition model, a purpose of learning, or computer performance of a device. The data processing models may be, for example, models based on a neural network. For example, a model, such as a deep neural network (DNN), a recurrent neural network (RNN), or a bidirectional recurrent DNN (BRDNN), may be used as a data processing model, but embodiments of the disclosure are not limited thereto.

The data learner 1610 may train the data processing models by using a learning algorithm or the like including, for example, error back-propagation or gradient descent.

The data learner 1610 may train a data processing model through supervised learning by using, for example, learning data as an input value. The data learner 1610 may train the data processing model through unsupervised learning to find a criterion for data processing, by self-training a type of data necessary for data processing without supervision, for example. The data learner 1610 may train the data processing model through reinforcement learning using a feedback about whether a result of the data processing according to training is right, for example.

When the data processing model is trained, the data learner 1610 may store the trained data processing model. In this case, the data learner 1610 may store the trained data processing models in a memory of an image display apparatus. Alternatively, the data learner 1610 may store the trained data processing model in a memory of a server that is connected with the image display apparatus via a wired or wireless network.

In this case, the memory that stores the trained data processing models may also store, for example, a command or data related to at least one other component of the image display apparatus. The memory may also store software and/or a program. The program may include, for example, a kernel, a middleware, an application programming interface (API), and/or an application program (or an application).

The data processor 1620 may input an image to a data processing model including a trained first neural network, and the data processing model may output, as a result value, semantic information corresponding to an image. The output result value may be used to update a data processing model including a first neural network.

The data processor 1620 may input an image to a data processing model including a trained second neural network, and the data processing model may output, as a result value, emotion information corresponding to an image. The output result value may be used to update a data processing model including a second neural network.

The data processor 1620 may input semantic information (or audio metadata) and emotion information to a data processing model including a trained third neural network, and the data processing model may output, as a result value, information about at least one piece of audio. The output result value may be used to update a data processing model including a third neural network.

The data processor 1620 may input an image (or emotion information of an image) to a data processing model including a trained fourth neural network, and the data processing model may output, as a result value, a weight. The output result value may be used to update a data processing model including a fourth neural network.

At least one of the data learner 1610 or the data processor 1620 may be manufactured in the form of at least one hardware chip and may be incorporated in an image display apparatus. For example, at least one of the data learner 1610 or the data processor 1620 may be manufactured in the form of a dedicated hardware chip for artificial intelligence (AI), or may be manufactured as a portion of an existing general-purpose processor (for example, a central processing unit (CPU) or an application processor (AP)) or a processor dedicated to graphics (for example, a graphics processing unit (GPU)) and may be mounted on any of the aforementioned various electronic devices.

In this case, the data learner 1610 and the data processor 1620 may be both incorporated in a single image display apparatus, or may be respectively incorporated in independent image display apparatuses. For example, one of the data learner 1610 and the data processor 1620 may be included in an image display apparatus, and the other may be included in the server. The data learner 1610 and the data processor 1620 may be connected to each other by wire or wirelessly, and thus model information established by the data learner 1610 may be provided to the data processor 1620 and data input to the data processor 1620 may be provided as additional learning data to the data learner 1610.

At least one of the data learner 1610 or the data processor 1620 may be implemented as a software module. When at least one of the data learner 1610 or the data processor 1620 is implemented using a software module (or a program module including instructions), the software module may be stored in non-transitory computer readable media. In this case, the at least one software module may be provided by an operating system (OS) or by a certain application. Alternatively, some of the at least one software module may be provided by an OS and the others may be provided by a certain application.

Figure 17:
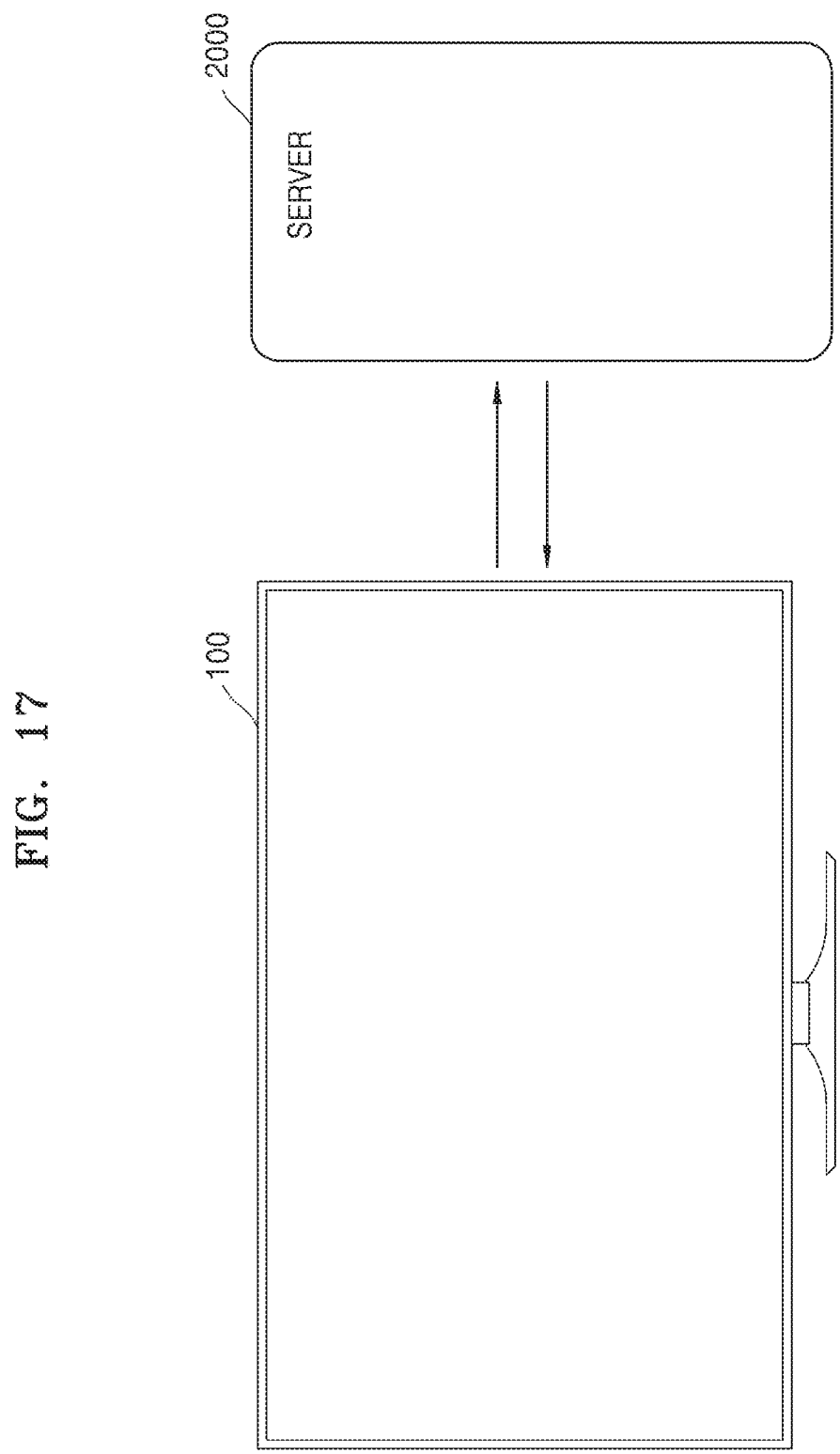
FIG. 17 illustrates a diagram illustrating an example of an image display apparatus according to an embodiment of the disclosure and a server interoperate with each other to learn and recognize data.

FIG. 17 is a diagram illustrating an example where an image display apparatus according to an embodiment of the disclosure and a server interoperate with each other to learn and recognize data.

Referring to FIG. 17, a server 2000 may train a first neural network by learning a criterion for obtaining semantic information from an image. The server 2000 may train a second neural network by learning a criterion for obtaining emotion information from the image. The server 2000 may train a third neural network by learning a criterion for determining at least one piece of audio from the semantic information and the emotion information. The server 2000 may train a fourth neural network by learning a criterion for determining a weight from an image or emotion information of the image. Based on results of the trainings performed by the server 2000, the image display apparatus 100 may obtain semantic information from an image, obtain emotion information from the image, determine at least one piece of audio from the semantic information and the emotion information, and determine a weight from the image or the emotion information of the image.

In this case, the server 2000 may perform a function of the data learner 1610 of FIG. 16. The server 2000 may learn a criterion regarding which training data is to be used to obtain semantic information from an image, a criterion regarding which training data is to be used to obtain emotion information from the image, a criterion regarding which training data is to be used to determine at least one piece of audio from the semantic information and the emotion information, and a criterion regarding which training data is to be used to determine a weight from the image or the emotion information of the image. By using data, the server 2000 may learn a criterion for obtaining semantic information from an image, a criterion for obtaining emotion information from the image, a criterion for determining at least one piece of audio from the semantic information and the emotion information, and a criterion for determining a weight from the image or the emotion information of the image.

By using the training data, the server 2000 may train a data processing model (first neural network) used to obtain the semantic information, a data processing model (second neural network) used to obtain the emotion information, a data processing model (third neural network) used to determine the at least one piece of audio from the semantic information and the emotion information, and a data processing model (fourth neural network) used to determine the weight from the image or the emotion information of the image.

The image display apparatus 100 may transmit data to the server 2000, and may request the server 2000 to process the data by applying the data to the data processing models (first through fourth neural networks). For example, by using the data processing models (first through fourth neural networks), the server 2000 may obtain semantic information from an image, obtain emotion information from the image, determine at least one piece of audio from the semantic information and the emotion information, and determine a weight from the image or the emotion information of the image.

Alternatively, the image display apparatus 100 may receive the data processing models generated by the server 2000 from the server 2000, and may process the data by using the received data processing models. For example, by using the received data processing models (first through fourth neural networks), the image display apparatus 100 may obtain semantic information from an image, obtain emotion information from the image, determine at least one piece of audio from the semantic information and the emotion information, and determine a weight from the image or the emotion information of the image.

Figure 18:
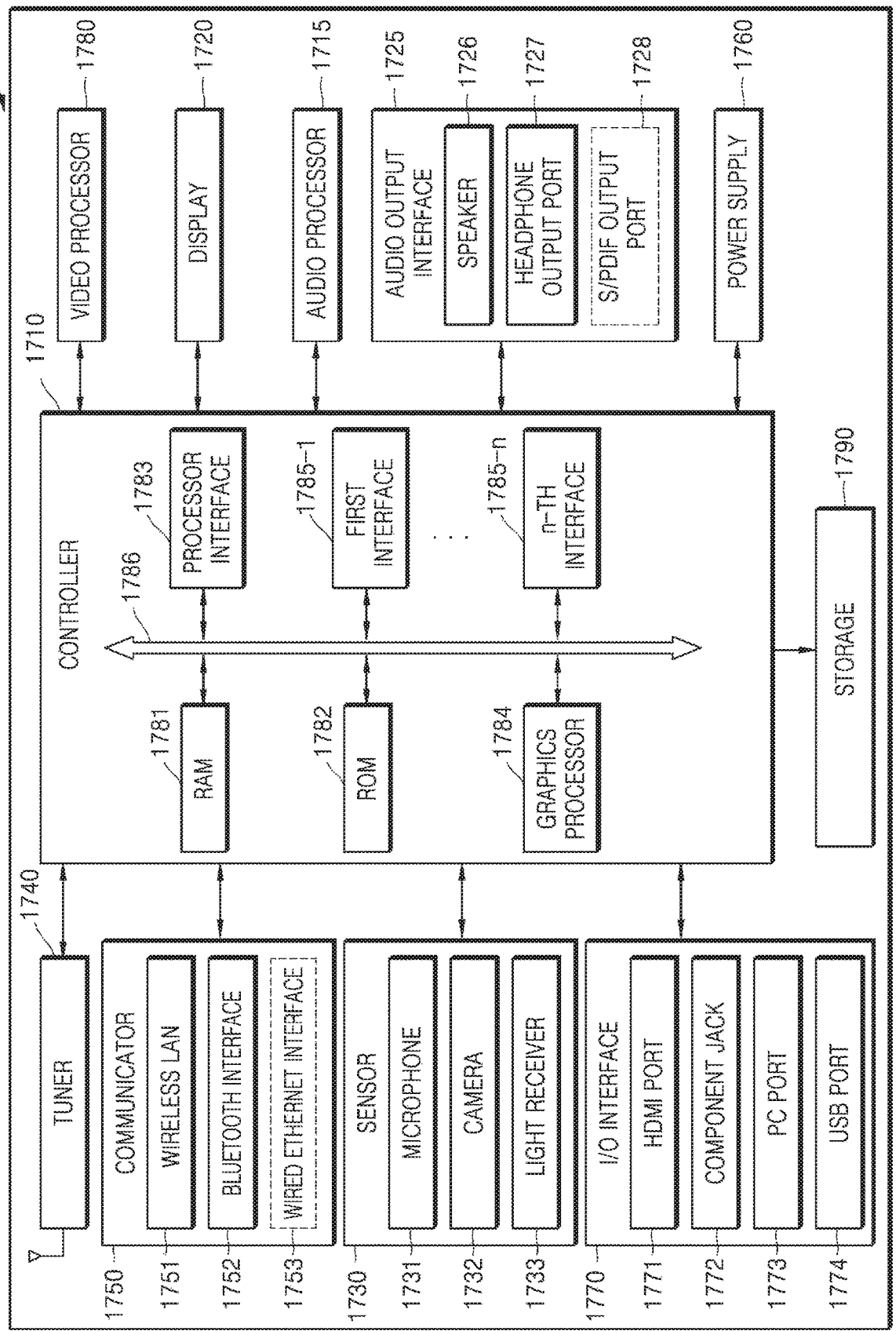
FIG. 18 illustrates a block diagram of a structure of an image display apparatus according to an embodiment of the disclosure.

FIG. 18 is a block diagram of a structure of an image display apparatus 1700 according to another embodiment of the disclosure. The image display apparatus 1700 of FIG. 18 may be an example of the image display apparatus 100 of FIG. 15.

Referring to FIG. 18, the image display apparatus 1700 may include a tuner 1740, a controller 1710, a display 1720, a communication interface 1750, a sensor 1730, an input/output (I/O) interface 1770, a video processor 1780, an audio processor 1715, a storage 1790, and a power supply 1760.

The tuner 1740 may tune and select only a frequency of a channel which the terminal device 1100 wants to receive from among many radio wave components that are obtained via amplification, mixing, resonance, or the like of a wired or wireless broadcasting signal. The broadcasting signal includes audio, video, and additional information (for example, an electronic program guide (EPG)).

The tuner 1740 may receive a broadcasting signal in a frequency band corresponding to a channel number according to a user input (for example, a control signal received from a control device, for example, a channel number input, a channel up-down input, and a channel input on an EPG screen image).

The tuner 1740 may receive a broadcasting signal from various sources, such as terrestrial broadcasting, cable broadcasting, satellite broadcasting, and Internet broadcasting. The tuner 1740 may also receive a broadcasting signal from a source such as analog broadcasting or digital broadcasting.

The communication interface 1750 may transmit or receive data or a signal to or from an external apparatus or a server under the control of the controller 1710. The controller 1710 may transmit/receive content to/from the external apparatus connected via the communication interface 1750, download an application from the external apparatus, or perform web-browsing. The communication interface 1750 may transmit or receive data or a signal according to at least one method from among a wireless local area network (LAN) 1751 (e.g., Wi-Fi), a Bluetooth network 1752, or a wired Ethernet network 1753 in correspondence to a performance and a structure of the image display apparatus 1700.

The video processor 1780 processes video data that is received by the image display apparatus 1700. The video processor 1780 may perform a variety of image processing, such as decoding, scaling, noise filtering, frame rate transformation, and resolution transformation, on the received video data.

The sensor 1730 senses a voice of a user, an image of the user, or an interaction with the user, and may include a microphone 1731, a camera 1732, and a light receiver 1733.

The microphone 1731 receives an uttered voice of the user. The microphone 1731 may transform the received voice into an electrical signal and output the electrical signal to the controller 1710. The user voice may include, for example, a voice corresponding to a menu or function of the image display apparatus 1700.

The camera 1732 may receive an image (for example, consecutive frames) corresponding to a motion of the user including a gesture within a recognition range of the camera 1732. The controller 1710 may select a menu that is displayed on the image display apparatus 1700 by using a result of the recognition of the received motion, or perform control corresponding to the result of the motion recognition.

The light receiver 1733 receives an optical signal (including a control signal) from an external control device via a light window (not shown) or the like of the bezel of the display 1720. The light receiver 1733 may receive an optical signal corresponding to a user input (for example, touch, pressing, a touch gesture, a voice, or a motion) from the control device. A control signal may be extracted from the received optical signal under the control of the controller 1710.

The I/O interface 1770 receives video (for example, a moving picture), audio (for example, a voice or music), and additional information (for example, an EPG) from outside the image display apparatus 1700 under the control of the controller 1710. The I/O interface 1770 may include a High-Definition Multimedia Interface (HDMI) port 1771, a component jack 1772, a PC port 1773, or a USB port 1774. The I/O interface 1770 may include a combination of the HDMI port 1771, the component jack 1772, the PC port 1773, and the USB port 1774.

The controller 1710 controls an overall operation of the image display apparatus 1700 and signal transfer among the internal components of the image display apparatus 1700 and processes data. When there is an input of a user or stored preset conditions are satisfied, the controller 1710 may execute an OS and various applications that are stored in the storage 1790.

The controller 1710 may include random-access memory (RAM) 1781 that stores a signal or data input by an external source of the image display apparatus 1700 or is used as a memory area for various operations performed by the image display apparatus 1700, read-only memory (ROM) 1782 that stores a control program for controlling the image display apparatus 1700, and a processor 1783.

A graphics processor 1784 generates a screen image including various objects, such as an icon, an image, and a text, by using an arithmetic unit (not shown) and a rendering unit (not shown). The arithmetic unit calculates attribute values, such as a coordinate value, a shape, a size, a color, and the like, with which each object is to be displayed according to layouts of the screen image, based on the user interaction sensed by the sensor 1730. The rendering unit generates screen images of various layouts including objects, based on the attribute values calculated by the arithmetic unit. The screen images generated by the rendering unit are displayed on a display area of the display 1720.

First through n-th interfaces 1785-1 through 1785-n are connected to the above-described components of the image display apparatus 1700. One of the first through n-th interfaces 1285-1 through 1285-n may be a network interface that is connected to an external apparatus via a network.

The RAM 1781, the ROM 1782, the processor 1783, the graphics processor 1784, and the first through n-th interfaces 1785-1 through 1785-n may be connected to each other via an internal bus 1786.

The term "a controller of an image display apparatus" used in the present embodiment of the disclosure includes the processor 1783, the ROM 1782, and the RAM 1781.

The display 1720 may generate a driving signal by converting an image signal, a data signal, an on-screen display (OSD) signal, and a control signal that are processed by the controller 1710. The display 1720 may be a plasma display panel (PDP), a liquid-crystal display (LCD), an organic light-emitting device (OLED), a flexible display, or a 3-dimensional (3D) display. The display 1720 may be configured as a touch screen, and thus may serve as an input device as well as an output device.

The audio processor 1715 processes audio data. The audio processor 1715 may perform a variety of processing, such as decoding, amplification, or noise filtering, on the audio data. The audio processor 1715 may include a plurality of audio processing modules to process audios corresponding to a plurality of pieces of content.

The audio output interface 1725 outputs audio included in a broadcasting signal received via the tuner 1740, under the control of the controller 1710. The audio output interface 1725 may also output audio (for example, a voice or a sound) that is input via the communication interface 1750 or the I/O interface 1770. The audio output interface 1725 may also output audio stored in the storage 1790 under the control of the controller 1710. The audio output interface 1725 may include at least one selected from a speaker 1726, a headphone output port 1727, and a Sony/Philips Digital Interface (S/PDIF) output port 1728. The audio output interface 1725 may include a combination of the speaker 1726, the headphone output port 1727, and the S/PDIF output port 1728.

The power supply 1760 supplies power that is input from an external power source, to the internal components of the image display apparatus 1700, under the control of the controller 1710. The power supply 1760 may also supply power that is output by one or more batteries (not shown) located in the image display apparatus 1700, to the internal components of the image display apparatus 1700, under the control of the controller 1710.

The storage 1790 may store various data, programs, or applications for driving and controlling the image display apparatus 1700 under the control of the controller 1710. The storage 1790 may include a broadcasting receiving module, a channel control module, a volume control module, a communication control module, a voice recognition module, a motion recognition module, a light receiving module, a display control module, an audio control module, an external input control module, a power control module, a power control module of a wirelessly (for example, Bluetooth) connected external apparatus, a voice database (DB), or a motion DB, which are not shown. These modules and the DBs of the storage 1790 may be implemented as software in order to perform a broadcasting reception control function of the image display apparatus 1700, a channel control function, a volume control function thereof, a communication control function thereof, a voice recognition function thereof, a motion recognition function thereof, a light receiving control function thereof, a display control function thereof, an audio control function thereof, an external input control function thereof, a power control function thereof, or a power control function of the wirelessly (for example, Bluetooth) connected external apparatus. The controller 1710 may perform these functions by using the software stored in the storage 1790.

The block diagrams of the image display apparatuses 100 and 1700 shown in FIGS. 15 and 18 are only exemplary embodiments of the disclosure. Components illustrated in FIGS. 15 and 18 may be combined or omitted according to the specifications of the image display apparatuses 100 and 1700 when being actually implemented, or additional components may be included in the block diagrams of FIGS. 15 and 18. In other words, two or more components may be combined into a single component, or a single component may be divided into two or more components. A function performed in each block is merely an example to explain embodiments of the disclosure, and a detailed operation or device of each block does not limit the scope of the embodiments of the disclosure.

An image display apparatus according to an embodiment of the disclosure may provide various esthetic experiences to a user by displaying an image and at the same time outputting audio corresponding to the displayed image.

The image display apparatus according to an embodiment of the disclosure may determine and output pieces of audio suitable for a plurality of images that are displayed on the image display apparatus.

An operation method of an image processing apparatus according to an embodiment of the disclosure may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the disclosure or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

Also, image display apparatuses or operation methods of the image display apparatuses according to the disclosed embodiments of the disclosure may be provided in a computer program product. The computer program product may be traded as a commodity between a seller and a purchaser.

The computer program product may include a software program and a computer-readable storage medium having the software program stored thereon. For example, the computer program product may include a product in the form of a software program (e.g., a downloadable app) that is electronically distributed through the manufacturer of an electronic device or an electronic market (e.g., Google Play Store, AppStore). For electronic distribution, at least a portion of the software program may be stored on a storage medium or may be created temporarily. In this case, the storage medium may be a server of a manufacturer, a server of an electronic market, or a storage medium of a relay server for temporarily storing an SW program.

The computer program product may include, in a system including a server and a client device, a storage medium of the server or a storage medium of the client device. Alternatively, when there is a third device (e.g., a smartphone) in communication with the server or client device, the computer program product may include a storage medium of the third device. Alternatively, the computer program product may include the S/W program itself transmitted from the server to the client device or the third device, or transmitted from the third device to the client device.

In this case, one of the server, the client device, and the third device may execute the computer program product to perform the methods according to embodiments of the disclosure. Alternatively, at least two of the server, the client device, and the third device may execute the computer program product to distribute and perform the methods according to embodiments of the disclosure.

For example, a server (e.g., a cloud server or an artificial intelligence server) may execute a computer program product stored on a server to control a client device communicating with the server to perform the methods according to embodiments of the disclosure.

While one or more embodiments of the disclosure have been described with reference to the figures, it will be understood by those of ordinary skill in the art that various changes in form and details may be made therein without departing from the spirit and scope as defined by the following claims.

What is claimed is:

1. An image display apparatus comprising:
   a display configured to display a plurality of images comprising a first image and a second image;
   a memory storing one or more instructions; and
   a processor configured to execute the one or more instructions stored in the memory to:
      obtain semantic information comprising first semantic information corresponding to the first image and second semantic information corresponding to the second image by using a first neural network,
      obtain emotion information comprising first emotion information corresponding to the first image and second emotion information corresponding to the second image by using a second neural network,
      determine a first weight corresponding to the first image, based on the first emotion information, and a second weight corresponding to the second image, based on the second emotion information,
      determine at least one piece of audio corresponding to the first image and the second image, based on the first weight, the second weight, the first semantic information, the second semantic information, the first emotion information, and the second emotion information, and
      output the at least one piece of audio.

2. The image display apparatus of claim 1, wherein the processor is further configured to determine the at least one piece of audio corresponding to the first semantic information, the second semantic information, the first emotion information, and the second emotion information by using a third neural network.

3. The image display apparatus of claim 1, wherein the processor is further configured to obtain audio information corresponding to the first image and the second image, based on the first semantic information and the second semantic information, and determine the at least one piece of audio, based on the audio information.

4. The image display apparatus of claim 1, wherein the processor is further configured to:
   determine first audio, based on the first semantic information and the first emotion information, and generate a first playlist including the first audio, and
   determine second audio, based on the second semantic information and the second emotion information, and generate a second playlist including the second audio.

5. The image display apparatus of claim 4, wherein the processor is further configured to select a playlist from among at least one of the first playlist and the second playlist, based on a user input, and output audio included in the playlist.

6. The image display apparatus of claim 1, wherein the processor is further configured to:

determine first audio, based on the first weight, the first semantic information, and the first emotion information;

determine second audio, based on the second weight, the second semantic information, and the second emotion information; and generate a playlist including the first audio and the second audio, wherein a number of pieces of the first audio and a number of pieces of the second audio are determined based on the first weight and the second weight.

7. The image display apparatus of claim 1, wherein the processor is further configured to change sizes of the first image and the second image, respectively based on the first weight and the second weight, and display the first image and the second image having changed sizes.

8. The image display apparatus of claim 1, wherein the processor is further configured to:

obtain representative emotion information that is representative of the first image and the second image, based on the first emotion information, the second emotion information, the first weight, and the second weight; and determine the at least one piece of audio, based on the representative emotion information.

9. The image display apparatus of claim 8, wherein the processor is further configured to generate a representative image by synthesizing the first image and the second image, based on at least one of the first weight and the second weight or the representative emotion information, and display the representative image.

10. The image display apparatus of claim 8, wherein the processor is further configured to obtain the representative emotion information, based on a background image that is displayed on the display.

11. An method of operating an image display apparatus, the method comprising:

displaying a first image among a plurality of images and a second image among the plurality of images;

obtaining semantic information comprising first semantic information corresponding to the first image and second semantic information corresponding to the second image by using a first neural network;

obtaining emotion information comprising first emotion information corresponding to the first image and second emotion information corresponding to the second image by using a second neural network;

determining a first weight corresponding to the first image, based on the first emotion information, and a second weight corresponding to the second image, based on the second emotion information;

determining at least one piece of audio corresponding to the first image and the second image, based on the first weight, the second weight, the first semantic information, the second semantic information, the first emotion information, and the second emotion information; and outputting the at least one piece of audio.

12. The method of claim 11, wherein the determining comprises determining the at least one piece of audio corresponding to the first semantic information, the second semantic information, the first emotion information, and the second emotion information by using a third neural network.

13. The method of claim 11, wherein the determining comprises:

obtaining audio information corresponding to the first image and the second image, based on the first semantic information and the second semantic information; and determining the at least one piece of audio, based on the audio information.

14. The method of claim 11, wherein the determining comprises:

determining first audio, based on the first semantic information and the first emotion information, and generating a first playlist including the first audio; and determining second audio, based on the second semantic information and the second emotion information, and generate a second playlist including the second audio.

15. The method of claim 14, further comprising selecting a playlist from among at least one of the first playlist and the second playlist, based on a user input; and outputting audio included in the playlist.

16. The method of claim 11, wherein the determining of the at least one piece of audio comprises:

determining first audio, based on the first weight, the first semantic information, and the first emotion information;

determining second audio, based on the second weight, the second semantic information, and the second emotion information; and generating a playlist including the first audio and the second audio, and wherein a number of pieces of the first audio and a number of pieces of the second audio are determined based on the first weight and the second weight.

17. The method of claim 11, further comprising:

changing sizes of the first image and the second image, respectively based on the first weight and the second weight; and displaying the first image and the second image having changed sizes.

18. The method of claim 11, wherein the determining of the at least one piece of audio comprises:

obtaining representative emotion information that is representative of the first image and the second image, based on the first emotion information, the second emotion information, the first weight, and the second weight; and determining the at least one piece of audio, based on the representative emotion information.

* * * * *